United States Patent
Ohno

(10) Patent No.: US 7,602,675 B2
(45) Date of Patent: Oct. 13, 2009

(54) OPTICAL RECORDING METHOD

(75) Inventor: Takashi Ohno, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 198 days.

(21) Appl. No.: 11/374,042

(22) Filed: Mar. 14, 2006

(65) Prior Publication Data
US 2006/0153047 A1 Jul. 13, 2006

Related U.S. Application Data

(63) Continuation of application No. PCT/JP2004/015173, filed on Oct. 14, 2004.

(30) Foreign Application Priority Data
Oct. 17, 2003 (JP) ............................. 2003-358054

(51) Int. Cl.
*G11B 11/00* (2006.01)
(52) U.S. Cl. .................................. 369/13.26
(58) Field of Classification Search ............... None
See application file for complete search history.

(56) References Cited

U.S. PATENT DOCUMENTS

| 5,732,062 | A | 3/1998 | Yokoi et al. |
| 5,818,808 | A | 10/1998 | Takada et al. |
| 5,848,043 | A | 12/1998 | Takada et al. |

(Continued)

FOREIGN PATENT DOCUMENTS

EP   0 388 897 B1   9/1990

(Continued)

OTHER PUBLICATIONS

Tatsuya Kato, et al., "The Phase Change Optical Disc with the Data Recording Rate of 140 Mbps", Jpn. J. Appl. Phys., vol. 41, No. 3B, Part 1, Mar. 2002, pp. 1664-1667.

(Continued)

*Primary Examiner*—Joseph H Feild
*Assistant Examiner*—Parul Gupta
(74) *Attorney, Agent, or Firm*—Oblon, Spivak, McClelland, Maier & Neustadt, L.L.P.

(57) ABSTRACT

Provided is an optical recording method for recoding information on a phase-change optical recording medium at a low linear velocity by use of a divided pulse method. When forming a plurality of recording marks by use of a constant divided pulse number m, a light irradiation time period of recording light for recording a recording mark having a time length of nT is divided in the order of $\{\alpha_1 T, \beta_1 T, \alpha_2 T, \beta_2 T, \ldots, \alpha_i T, \beta_i T, \ldots, \alpha_m T, \beta_m T\}$ (in which m is a natural number representing a divided pulse number, $\alpha_i$ ($1 \leq i \leq m$) is a real number greater than 0, $\beta_i$ ($1 \leq i \leq m-1$) is a real number greater than 0, and $\beta_m$ is a real number equal to or above 0). Then, the recording light having increased recording power $Pw_i$ for recording the shortest recording mark is applied so as to provide m satisfying a relation that an average value $Pw_{short}$ of the recording power $Pw_i$ at the time periods of $\alpha_i T$ for forming the shortest recording mark is greater than an average value $Pw_{long}$ of the recording power $Pw_i$ at the time periods of $\alpha_i T$ for forming the longest recording mark ($Pw_{short} > Pw_{long}$).

10 Claims, 5 Drawing Sheets

U.S. PATENT DOCUMENTS

Figure 1:
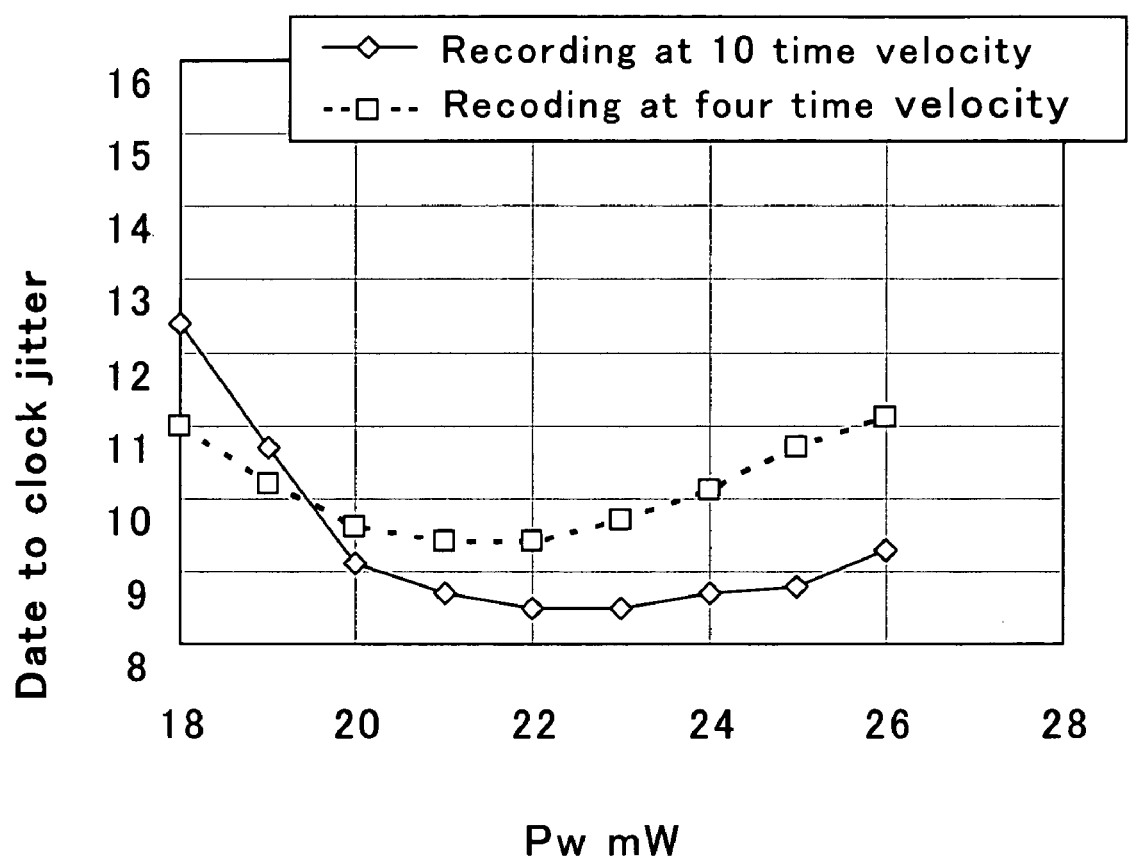

| | | |
|---|---|---|
| 6,256,277 B1 | 7/2001 | Saga et al. |
| 6,411,579 B2 * | 6/2002 | Nobukuni et al. ........ 369/59.12 |
| 6,661,760 B2 | 12/2003 | Nobukuni et al. |
| 6,801,240 B2 | 10/2004 | Abe et al. |
| 6,898,174 B2 | 5/2005 | Kuribayashi et al. |
| 7,050,377 B1 | 5/2006 | Nobukuni et al. |
| 2002/0196324 A1 | 12/2002 | Abe et al. |
| 2003/0152006 A1 | 8/2003 | Ohkura et al. |
| 2003/0156519 A1 | 8/2003 | Yokoi |
| 2003/0210642 A1 | 11/2003 | Kuribayashi et al. |
| 2003/0214857 A1 | 11/2003 | Horie et al. |
| 2004/0052165 A1 | 3/2004 | Kuribayashi et al. |
| 2004/0190407 A1 | 9/2004 | Nobukuni et al. |
| 2004/0248036 A1 | 12/2004 | Ohno et al. |
| 2005/0041552 A1 | 2/2005 | Shoji et al. |
| 2005/0265215 A1 | 12/2005 | Horie et al. |
| 2006/0013098 A1 | 1/2006 | Nobukuni et al. |
| 2006/0062125 A1 | 3/2006 | Horie et al. |

FOREIGN PATENT DOCUMENTS

| | | |
|---|---|---|
| EP | 0 902 424 B1 | 3/1999 |
| EP | 1 182 649 A1 | 2/2002 |
| JP | 4-21969 | 1/1992 |
| JP | 8-124163 | 5/1996 |
| JP | 8-287465 | 11/1996 |
| JP | 9-134525 | 5/1997 |
| JP | 9-282661 | 10/1997 |
| JP | 10-214423 | 8/1998 |
| JP | 11-102522 | 4/1999 |
| JP | 11-175976 | 7/1999 |
| JP | 2000-11380 | 1/2000 |
| JP | 2001-155339 | 6/2001 |
| JP | 2001-331936 | 11/2001 |
| JP | 2002-334433 | 11/2002 |
| JP | 2003-203340 | 7/2003 |
| JP | 2003-228834 | 8/2003 |

OTHER PUBLICATIONS

Natsuko Nobukuni, et al., "High speed rewritable CD and DVD", Proceedings of the $12^{TH}$ Symposium on Phase Change Optical Information Storage, PCOS2000, Nov. 30- Dec. 1, 2000, pp. 52-55.

Michikazu Horie, et al., "High speed rewritable DVD up to 20 m/s with nucleation-free eutectic phase-change material of $Ge(Sb_{70}Te_{30})+Sb$", Proceedings of SPIE, Optical Data Storage 2000, May 14-17, 2000, pp. 135-143.

Michikazu Horie, et al., "Material Characterization and Application of Eutectic SbTe Based Phase-Change Optical Recording Media", Proceedings of SPIE (Reprint), Optical Data Storage 2001, vol. 4342, Apr. 22-25, 2001, pp. 76-87.

* cited by examiner

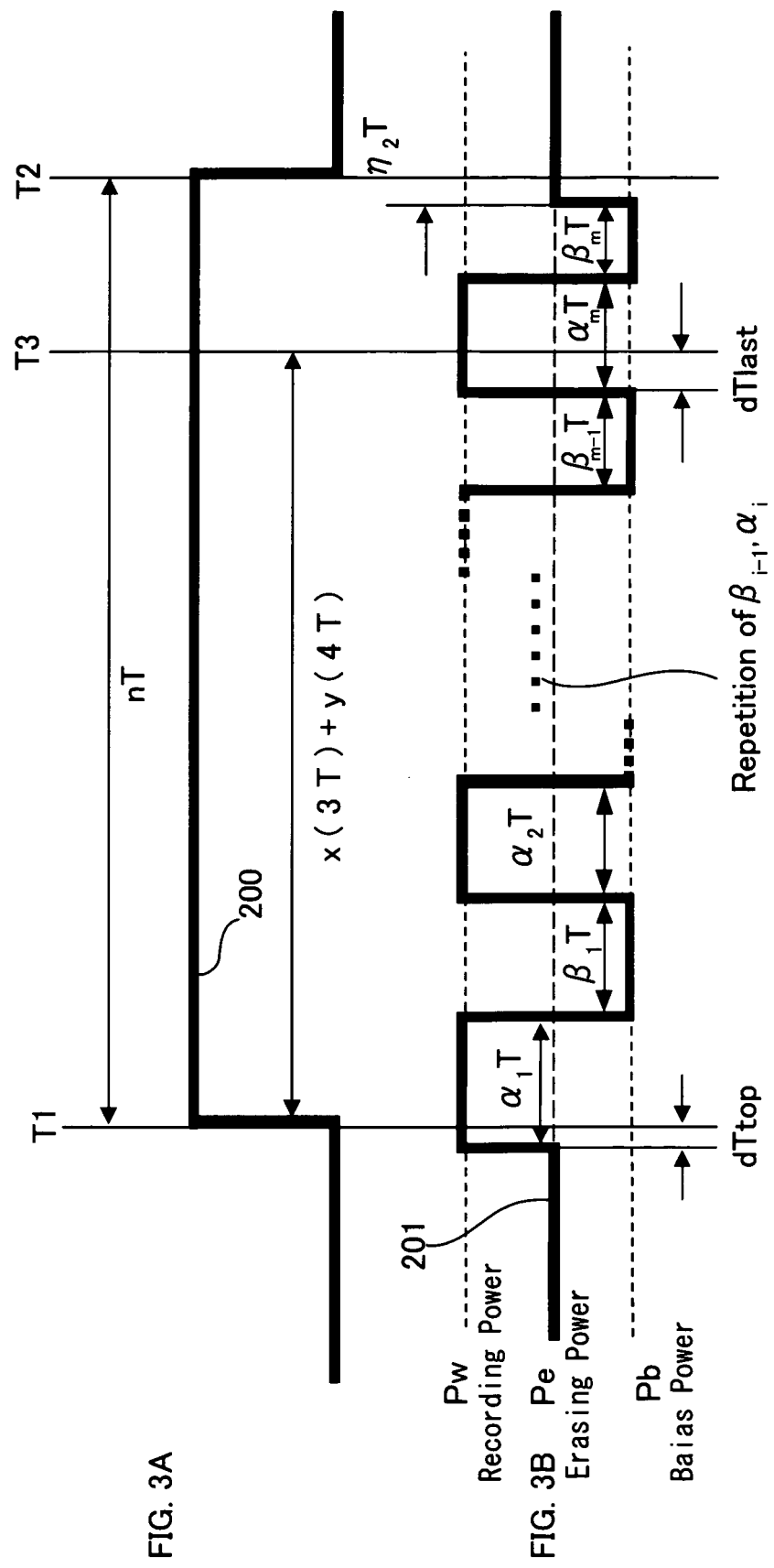

FIG. 4A
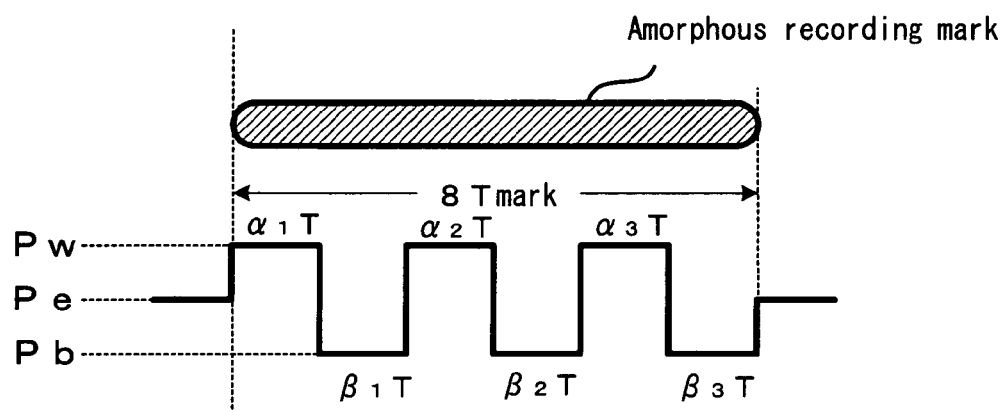
FIG. 4B
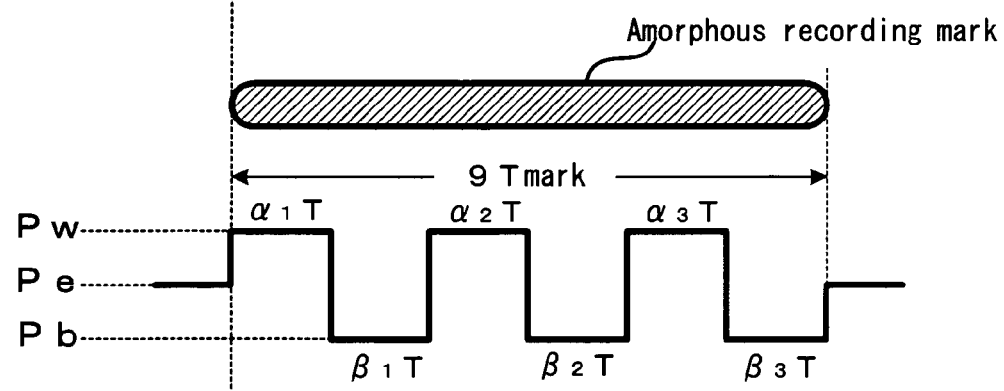
FIG. 4C
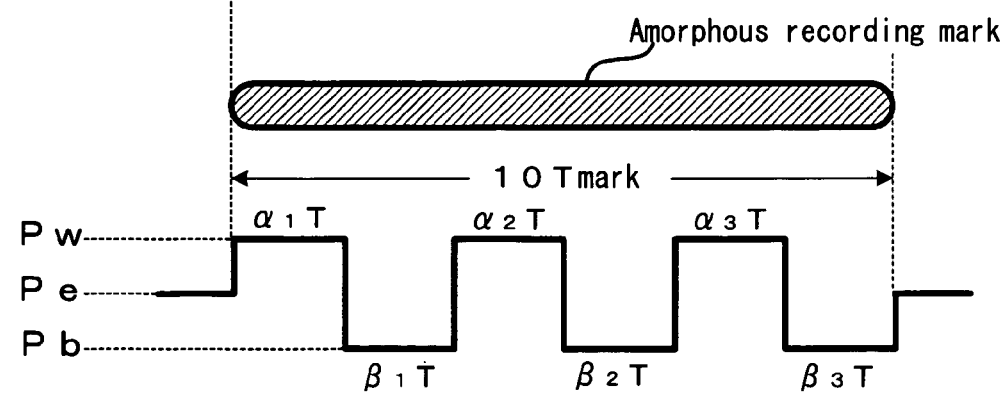

OPTICAL RECORDING METHOD

TECHNICAL FIELD

The present invention relates to an optical recording method, or more specifically to an optical recording method for a rewritable phase-change optical recording medium.

BACKGROUND ART

In recent years, a phase-change rewritable compact disc (a CD-RW or a CD-Rewritable) or a phase-change rewritable DVD (product name: a DVD-RW or a DVD+RW; hereinafter referred to as a "RW-DVD" as appropriate) is used as a rewritable optical recording medium (such an optical recording medium will be hereinafter simply referred to as a disc or an optical disc as appropriate). The CD-RW or the RW-DVD of the phase-change type detects recorded information signals by use of a difference in reflectivity and a phase depth caused by a difference in a refractive index of a recording layer between an amorphous state and a crystalline state. Normally, the CD-RW or the RW-DVD of the phase-change type has a structure in which a lower protective layer, a phase-change recording layer (hereinafter simply referred to as a "recording layer" as appropriate), an upper protective layer, and a reflective layer are provided on a substrate. Accordingly, it is possible to control the difference in the reflectivity and the phase depth and to provide compatibility with a CD or a DVD by use of multiple interactions among these layers.

Recording on the CD-RW or the RW-DVD means overwrite recording in which a recording operation and an erasing operation are performed at the same time. Normally, in order to form one amorphous mark, a recording laser pulse is divided and a recording pulse sequence having a length corresponding to a mark length is irradiated (the divided pulse method). To be more precise, upon formation of recording mark lengths having various lengths, a laser beam to be applied on the recording layer is divided into a recording pulse for applying light having recording power Pw and a cooling pulse for applying light having low power (bias power Pb) equivalent to a retrieving power. Then, recording marks in the amorphous state having the various lengths are formed by repeatedly applying the light having the recording power Pw (the recording pulses) and the light having the bias power Pb (the cooling pulses).

FIG. 3 is a view for describing the divided pulse method in a general optical recording method. FIG. 3A shows a timing chart of a recording mark having a recording length of nT to be formed. FIG. 3B shows a timing chart of a method of dividing a recording pulse for forming the recording mark having the recording length of nT. A timing chart 200 of the recording mark having the recording length of nT shown in FIG. 3A corresponds to time duration of the recording mark having the length of nT. This timing chart 200 rises at time T1 (a starting point of an nT mark) synchronously with a reference clock, and after passage of the time period nT, falls at time T2 (an ending point of the nT mark) again synchronously with the reference clock. A timing chart 201 of the method of dividing the recording pulse for forming the recording mark having the recording length of nT shown in FIG. 3B, shows a waveform representing change with time of light energy divided into a plurality of recording pulse intervals $\alpha_i T$ and cooling pulse intervals $\beta_i T$ to form the nT mark length. As shown in FIG. 3B, the recording power Pw is constant in terms of the recording pulse intervals $\alpha_i T$ (i=integer from 1 to m), and the bias power Pb is constant in terms of the cooling pulse intervals $\beta_i T$ (i=integer from 1 to m). Moreover, erasing power Pe is constant in terms of intervals between the marks and in terms of intervals other than the intervals $\alpha_i T$ (i=1 to m) and $\beta_i T$ (i=1 to m).

As described above, one of the reasons for dividing the laser beam to be applied on the recording layer upon formation of the recording mark lengths having the various lengths into the recording pulses for applying the light having the recording power Pw and the cooling pulses for applying the light having the bias power Pb as low as the retrieving power is to ensure a cooling rate which is necessary for forming the amorphous state. For this reason, the cooling rate becomes faster as lengths (a cooling pulse) between the pulses in the pulse sequence become longer. Meanwhile, a laser beam having the erasing power Pe lower than the recording power Pw is applied during the interval between the recording marks, whereby an amorphous mark existing prior to overwriting is crystallized.

In recent years, in order to accelerate a data transfer rate, developments of media which are recordable at a high linear velocity are in progress. Since it is necessary to crystallize (erase) the amorphous mark in a short period in overwrite recording at a high linear velocity, a recording material having a high crystallization rate is used in a recording layer. On the other hand, since the recording material having the high crystallization rate is used in the recording layer, recrystallization is apt to occur during recording the marks as well. Therefore, when using the recording material having the high crystallization rate, it is necessary to accelerate the cooling rate sufficiently in order to form the amorphous marks while suppressing recrystallization during recording the marks. For this reason, it is necessary to lengthen the cooling pulse between the recording pulses. As an effective method of lengthening the cooling pulse sufficiently, it is possible to cite a method of recording a plurality of mark lengths by use of pulse sequences having the same divided number, for example. To be more precise, there is a report concerning an optical recording method configured to record a plurality of mark lengths by use of pulse sequences having the same divided number at a linear velocity (12 m/s) which is 10 times as fast as a CD (see Patent Document 1).

Patent Document 1: Japanese Unexamined Patent Publication No. 2001-331936 (see Paragraph (0178) and Paragraph (0179)).

DISCLOSURE OF THE INVENTION

Problem to be Solved by the Invention

Incidentally, the above-described medium which can achieve the high transfer rate is also expected to be able to achieve recording at a relatively low linear velocity at the same time. This is because a difference in the linear velocity between an inner peripheral portion and an outer peripheral portion of a disc is caused when rotating the disc at a constant rotation speed, which is almost as large as three times. Moreover, there are also many cases where a relatively low transfer rate is sufficient depending on the uses.

However, as a result of studies by the inventor, it is made clear that there is a case where an excellent recording characteristic is hardly obtained by recording at a relatively low linear velocity on a phase-change optical recording medium which allows a high transfer rate.

As described above, the present invention has been made to solve the problem emerging in the case of recording on a phase-change optical recording medium which allows a high transfer rate.

Specifically, an object of the present invention is to provide an optical recording method which exhibits an excellent recording characteristic in the case of recording at a relatively low linear velocity on a phase-change optical recording medium having a high crystallization rate that allows a high transfer rate.

Means for Solving the Problem

To solve the problem, in the case of forming a plurality of recording marks respectively while setting a constant divided number in recording pulses, the present invention adopts a method configured to raise recording power for recording the shortest recording mark among the plurality of recording marks.

Specifically, an optical recording method applying the present invention is an optical recording method configured to apply recording light locally on an optical recording medium and to record information subjected to mark length modulation by use of recording marks having a plurality of time lengths, the optical recording method includes the steps of dividing a light irradiation time period when defining a time length of one recording mark as nT (T is a reference clock period and n is a natural number equal to or above 2) for recording the recording mark having the time length of nT in the order of $$\alpha_1 T, \beta_1 T, \alpha_2 T, \beta_2 T, \ldots, \alpha_i T, \beta_i T, \ldots, \alpha_m T, \beta_m T \quad \text{[Formula 1]}$$

(in which m is a natural number representing a divided pulse number, $\alpha_i$ ($1 \leq i \leq m$) is a real number greater than 0, $\beta_i$ ($1 \leq i \leq m-1$) is a real number greater than 0, and $\beta_m$ is a real number equal to or above 0), applying recording light having recording power $Pw_i$ ($1 \leq i \leq m$) in time periods of $\alpha_i T$ ($1 \leq i \leq m$), applying recording light having bias power Pb satisfying $Pb \leq 0.2 \times Pw_i$ ($1 \leq i \leq m$) in time periods of $\beta_i T$ ($1 \leq i \leq m$), setting the divided pulse number m equal to or above 2 in terms of at least one recording mark out of the recording marks having the plurality of time lengths, and forming a plurality of recording marks having a time length of nT by use of the same divided pulse number m. Here, there is an m satisfying $Pw_{short} > Pw_{long}$ on the assumptions that an average value of the recording power $Pw_i$ at the time periods of $\alpha_i T$ ($1 \leq i \leq m$) for forming a recording mark having the longest nT among the plurality of recording marks having the time lengths of nT is defined as $Pw_{long}$ and that an average value of the recording power $Pw_i$ at the time periods of $\alpha_i T$ ($1 \leq i \leq m$) for forming a recording mark having the shortest nT among the plurality of recording marks having the time lengths of nT is defined as $Pw_{short}$.

Here, in the optical recording method applying the present invention, it is preferable that the m satisfying $Pw_{short} > Pw_{long}$ be equal to 1 and/or 2. Moreover, in the optical recording method applying the present invention, it is preferable in the case of recording the information subjected to the mark length modulation by use of two types of a recording linear velocity $V_{min}$ and a recording linear velocity $V_{max}$ (where $V_{max} > V_{min}$) that there be the m satisfying $Pw_{short} > Pw_{long}$ at the recording linear velocity $V_{min}$. In this case, it is preferable that a relation between the recording linear velocity $V_{min}$ and the recording linear velocity $V_{max}$ satisfy $V_{max} \geq 2V_{min}$.

Moreover, in the optical recording method applying the present invention, on the assumptions that m pieces of the recording power $Pw_i$ in the range of $1 \leq i \leq m$ for forming the recording mark having the longest nT among the recording marks having the plurality of the time lengths nT are respectively set equal to $Pw_1$, that at least part of the recording power $Pw_i$ out of m pieces of the recording power $Pw_i$ in the range of $1 \leq i \leq m$ for forming the recording mark having the shortest nT among the recording marks having the plurality of the time lengths nT is set equal to $Pw_0$, and that the remaining pieces of the recording power $Pw_i$ are set equal to $Pw_1$, it is preferable that a relation between $Pw_0$ and $Pw_1$ satisfy $Pw_0 > Pw_1$. In this case, it is preferable to set all the m pieces of the recording power $Pw_i$ in the range of $1 \leq i \leq m$ for forming the recording mark having the shortest nT among the recording marks having the plurality of the time lengths nt equal to $Pw_0$.

Meanwhile, the present invention provides the optical recording method configured to apply recording light locally on an optical recording medium and to record information subjected to mark length modulation by use of recording marks having a plurality of time lengths. It is preferable that the optical recording method applying the present invention be applied to an optical recording medium including a phase-change recording layer configured to record information by use of a crystalline state and an amorphous state and to be able to rewrite the information. That is to say, it is possible to control recrystallization of the recording layer by controlling a melting process and a cooling process of the recording layer, and an effect to obtain fine recording marks becomes prominent. For this reason, as the optical recording medium configured to record the information subjected to the mark length modulation using the recording marks having the plurality of time lengths by use of the optical recording method applying the present invention, it is particularly preferable to use the optical recording medium including the phase-change recording layer configured to record the information by use of the crystalline state and the amorphous state and to be able to rewrite the information.

Effect of the Invention

According to the present invention, it is possible to obtain an optical recording method which exhibits an excellent recording characteristic in the case of recording at a relatively low linear velocity on a phase-change optical recording medium having a high crystallization rate that allows a high transfer rate.

BRIEF DESCRIPTION OF THE DRAWINGS (FIG. 1)

FIG. 1 is a graph showing results of measurement of dependencies of data to clock jitter on recording power Pw in Experiment 1 and Experiment 2.

(FIG. 2)

Figure 2:
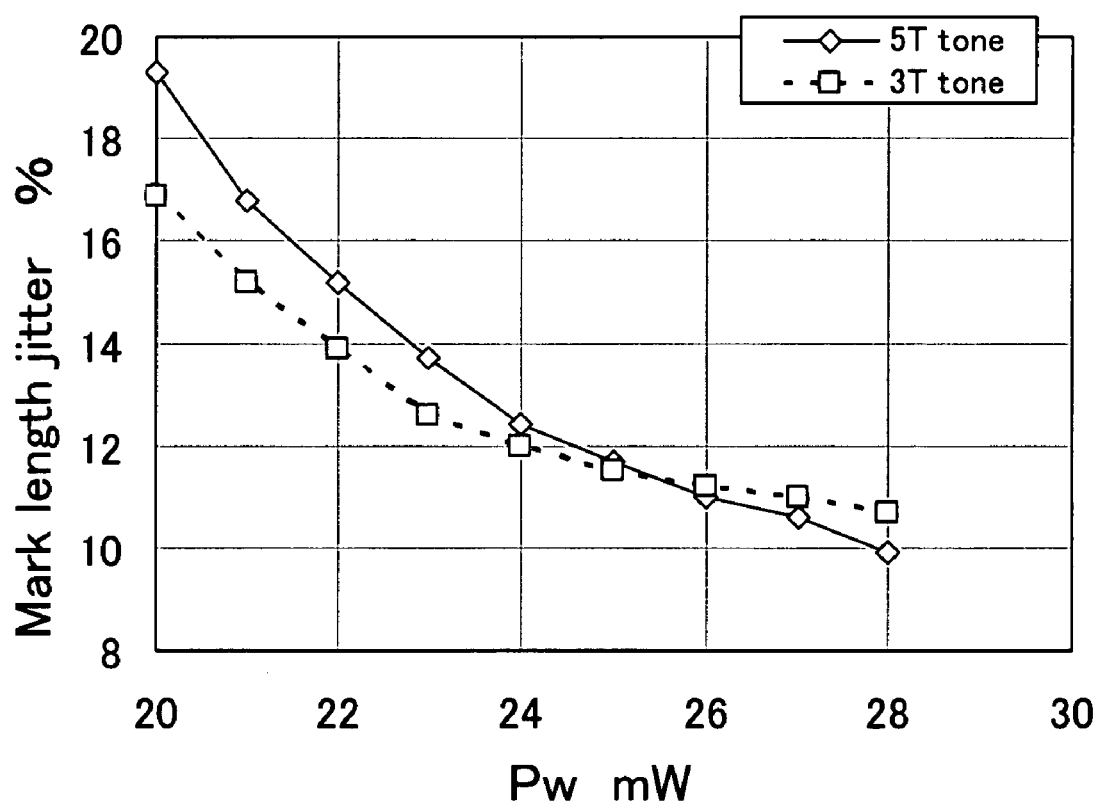

FIG. 2 is a graph showing a result of measurement of a dependency of the mark length jitter on the recording power Pw in Experiment 3.

(FIG. 3)

FIGS. 3A and 3B are views for describing a divided pulse method in a general optical recording method, in which FIG. 3A shows a timing chart of a recording mark having a recording length of nT to be formed, and FIG. 3B shows a timing chart of a method of dividing a recording pulse for forming the recording mark having the recording length of nT.

(FIG. 4)

FIGS. 4A to 4C are views for describing an optical recording method applying an embodiment of the present invention, which is configured to record a plurality of nT marks having different lengths by use of the pulse sequences having the same divided number m. FIG. 4A shows a timing chart of a method of dividing a recording pulse for forming an 8T mark, FIG. 4B shows a timing chart of a method of dividing a recording pulse for forming a 9T mark, and FIG. 4C shows a timing chart of a method of dividing a recording pulse for forming a 10T mark.

(FIG. 5)

Figure 5:
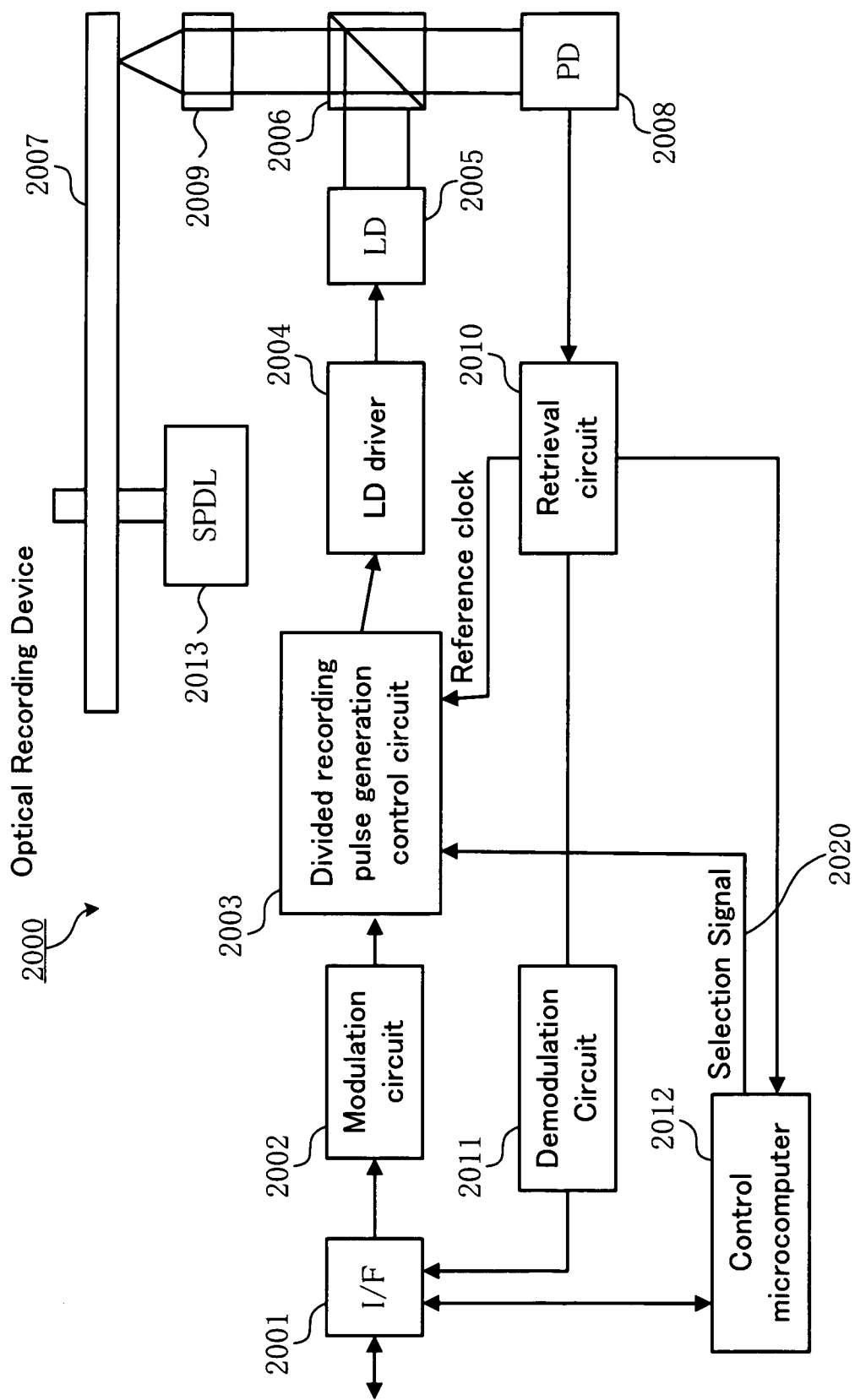

FIG. 5 is a view showing an example of an optical recording device for embodying the optical recording method applying the embodiment.

BEST MODES FOR CARRYING OUT THE INVENTION

The best modes for carrying out the present invention (hereinafter referred to as embodiments of the invention) will be described below in detail. Note that the present invention will not be limited to the following embodiments, and that it is possible to embody the present invention in the form of various modifications within the scope thereof.

Now, when a time length of one recording mark is defined as nT (T is a reference clock period and n is a natural number equal to or above 2), a light irradiation time period for recording the recording mark of nT is divided in the order of $$\alpha_1 T, \beta_1 T, \alpha_2 T, \beta_2 T, \ldots, \alpha_i T, \beta_i T, \ldots, \alpha_m T, \beta_m T \quad \text{[Formula 2]}$$

(in which m is a natural number representing a divided pulse number, $\alpha_i$ ($1 \leq i \leq m$) is a real number greater than 0, $\beta_i$ ($1 \leq i \leq m-1$) is a real number greater than 0, and $\beta_m$ is a real number equal to or above 0). Then, a pulse sequence configured to apply recording light having recording power $Pw_i$ ($1 \leq i \leq m$) in time periods of recording pulses $\alpha_i T$ ($1 \leq i \leq m$) and to apply recording light having bias power Pb (lower power which is equivalent to retrieving power) satisfying $Pb \leq 0.2 \times Pw_i$ ($1 \leq i \leq m$) in time periods of cooling pulses $\beta_i T$ ($1 \leq i \leq m$) is used. As described above, the recording power $Pw_i$ is defined as the value which is variable depending on the i value.

Here, the n may apply a finite value in accordance with the coding theory. Moreover, it is not necessary to set an upper limit to the n value. It is to be noted, however, that n usually applies a value equal to or below 100, or practically equal to or below 50, or more practically equal to or below 20. In the meantime, n is usually set to a natural number equal to or above 2, and a minimum value of n is usually set to 2 or 3.

Next, an example of the reference clock period T will be described below.

For example, when T=231 nsec corresponds to a 1-times (1.2 m/s to 1.4 m/s) reference velocity for a CD, T=5.8 nsec holds true at a 40-times velocity and T=4.7 nsec corresponds to a 48-times velocity. Meanwhile, when T=38.2 nsec corresponds to a 1-times (3.49 m/s) reference velocity for a DVD, T=3.82 nsec corresponds to a 10-times velocity, T=3.2 nsec corresponds to a 12-times velocity, and T=2.4 nsec corresponds to a 16-times velocity.

In terms of an optical disc including a phase-change recording layer, it is customary to form an amorphous mark by raising a temperature of the recording layer equal to or above a melting point while applying a laser beam and then suddenly cooling down the recording layer. In this case, in order to form the amorphous mark, both of the process of raising the temperature sufficiently and the process of suddenly cooling down are essential. Although the temperature is raised easily when the irradiation time period $\alpha_i T$ is set long. However, when the irradiation time period $\alpha_i T$ is too long, the cooling rate slows down at a portion on which irradiation of the laser beam is started, and the portion is recrystallized without forming the amorphous state. Therefore, upon formation of the long mark, it is normally necessary to divide an irradiation interval of the laser beam having the recording power into ($\alpha_1 T, \alpha_2 T, \ldots, \alpha_{m-1} T, \alpha_m T$). To raise the temperature, a lower limit of the divided number m naturally becomes equal to 1. Usually, the number of types of different mark lengths to be recorded by use of the same m is preferably equal to or below six types, or more preferably equal to or below five types. It is to be noted that a case of using different numbers of divisions m in terms of all the types of the mark lengths is not included in the present invention.

(When Recording at High Velocity)

Next, a case of applying the optical recording method to high velocity recording according to the divided pulse method will be described. It is necessary to use a recording material having a high crystallization rate for the recording layer in a rewritable phase-change recording medium which allows a high data transfer rate. This is because it is necessary to crystallize an amorphous mark, which exists prior to overwriting, in a short period at the time of overwriting. Meanwhile, since the crystallization rate is accelerated, recrystallization is apt to occur at the time of recording the recording mark in the amorphous state. It is necessary to accelerate the cooling rate in order to form the fine amorphous mark while suppressing this recrystallization at the time of recording. For this reason, it is necessary to lengthen duration $\beta_i T$ of the cooling pulses in the pulse sequence. Moreover, when the length of $\beta_i T$ needs to be longer than the reference clock period, it is basically necessary to use a recording method of recording nT marks having a plurality of lengths by use of pulse sequences having the same divided number m. Such a recording method may be often indispensable when the reference clock period at the highest overwritable linear velocity is shorter than 10 ns.

Next, a case of the optical recording method of recording the above-described plurality of nT marks by use of the pulse sequences having the same divided number m will be described. FIGS. 4A to 4C are views for explaining the optical recording method applying the present invention, which is configured to record a plurality of nT marks having different lengths by use of the pulse sequences having the same divided number m. FIG. 4A shows a timing chart of a method of dividing a recording pulse for forming an 8T mark. FIG. 4B shows a timing chart of a method of dividing a recording pulse for forming a 9T mark. Moreover, FIG. 4C shows a timing chart of a method of dividing a recording pulse for forming a 10T mark. Note that the recording power $Pw_i$ is set constant (Pw) irrespective of i in FIGS. 4A to 4C.

As shown in FIG. 4A to FIG. 4C, when recording the plurality of nT marks (the 8T mark to the 10T mark) having the different lengths by use of the pulse sequences having the same divided number m (m=3 in the case of FIGS. 4A to 4C), the pulse sequence for forming the shorter nT mark (the 8T mark) among the plurality of nT marks to be recorded by use of the same divided pulse number (m=3) has a shorter mark length as compared to the pulse sequence for forming the longer nT mark (the 9T mark or the 10T mark). For this reason, in terms of the pulse sequence for forming the shorter nT mark (the 8T mark), it is necessary either to reduce an average value of $\beta_i$ or to reduce an average value of $\alpha_i$ as compared to the pulse sequence for forming the longer nT mark (the 9T mark or the 10T mark). In many cases, it is necessary to reduce both of the average values of $\alpha_i$ and $\beta_i$.

However, when $\beta_i$ is averagely reduced in terms of the shorter nT mark (the 8T mark), cooling tends to be insufficient at the time of forming the recording mark. As a result, recrystallization may occur at the time of recording and a recording characteristic tends to be degraded. Accordingly, it is not possible to simply shorten Pi in terms of this short nT mark (the 8T mark) in order to shorten the mark length. Moreover, even when shortening $\beta_i$, it is necessary to ensure an adequate amount for avoiding degradation in the recording characteristic attributable to recrystallization at the time of recording.

Since it is necessary to ensure the amount of $\beta_i$ upon formation of the shorter nT mark (the 8T mark), the average length of $\alpha_i$ for the recording pulse needs to be set smaller than the case of the longer nT mark (the 9T mark or the 10T mark). This is required for setting the mark length closer to an ideal length. That is, the mark length is usually determined by a length of a portion to be melted (the length of the recording pulse) and by a length of a region to be recrystallized after melting. Moreover, the length of the portion to be melted is determined mainly by a length from a front end recording pulse to a rear end recording pulse having the recording power $Pw_i$, or in other words, mainly by a spatial length corresponding to the time length $(\alpha_1 T+\beta_1 T+ \ldots +\beta_{m-1}+\alpha_m T)$ of the pulse. That is, the length of the melting portion is determined mainly by the amount of $(\alpha_1+\beta_1+\ldots+\beta_{m-1}+\alpha_m)$. Therefore, when increasing $\beta_i$, it is necessary to reduce $\alpha_i$ in order to align the mark length. Moreover, when $\alpha_i$ is reduced to align the mark length upon formation of the shorter nT mark (the 8T mark), there may be a case where the recording power $Pw_i$ runs insufficient only in terms of this shorter mark (the 8T mark).

Therefore, in the optical recording method applying the present invention, an excellent recording characteristic can be obtained by raising the recording power $Pw_i$ (Pw in FIGS. 4A to 4C) only in terms of this shorter mark (the 8T mark). It is to be noted, however, that the length of the portion to be melted corresponds to the spatial length equivalent to $(\alpha_1 T+\beta_1 T+\ldots+\alpha_{m-T}+\alpha_m$ as described above. For this reason, as a method of raising the recording power $Pw_i$ only in terms of this short mark (the 8T mark), an average value of the recording power $Pw_i$ to be applied on all the portions to be melted (all the m pieces of $\alpha_i T$) is increased. Here, the average value of $Pw_i$ in terms of the time periods $\alpha_i T$ ($1 \leq i \leq m$) can be obtained as described below.

Specifically, firstly, $Pw_i$ representing a time function with respect to arbitrary i is integrated over a time period range of $\alpha_i T$. Then, this integration is carried out respectively in terms of the m pieces of $Pw_i$ and $\alpha_i T$ in the range of $1 \leq i \leq m$. The average value of the recording power $Pw_i$ in terms of the time periods $\alpha_i T$ ($1 \leq i \leq m$) can be obtained by summing up the m pieces of integral values thus obtained and then dividing this value by the time periods $(\alpha_1 T+\alpha_2 T+\ldots+\alpha_m T)$. For example, on the assumption that the recording power $Pw_i$ is set to a constant value during $\alpha_i T$ in terms of each i factor, a total value of the recording power applied for forming one recording mark $\Sigma(Pw_i \times \alpha_i T)$ is expressed as follows:

$$\Sigma(Pw_i \times \alpha_i T) = \{(Pw_1 \times \alpha_1 T)+(Pw_2 \times \alpha_2 T)+\ldots+(Pw_{m-1} \times \alpha_{m-1} T)+(Pw_m \times \alpha_m T)\} \quad \text{[Formula 3]}$$

Therefore, the average value of $Pw_i$ in terms of the time periods $\alpha_i T$ ($1 \leq i \leq m$) can be obtained by calculating:

$$\Sigma(Pw_i \times \alpha_i T)/(\alpha_1 T+\alpha_2 T+\ldots+\alpha_m T) \quad \text{[Formula 4]}$$

Moreover, when forming the plurality of recording marks having different lengths nT by use of the same divided pulse number m, an average value of the recording power $Pw_i$ at the time periods of $\alpha_i T$ ($1 \leq i \leq m$) for forming the longest recording mark among the plurality of recording marks is defined as $Pw_{long}$, and an average value of the recording power $Pw_i$ at the time periods of $\alpha_i T$ ($1 \leq i \leq m$) for forming the recording mark having the shortest nT is defined as $Pw_{short}$. Then, there is provided m satisfying $Pw_{short} > Pw_{long}$.

(When Recording at Low Linear Velocity)

Next, a case of applying the optical recording method according to the divided pulse method to low velocity recording will be described. On the assumption that a position of light irradiation (a relation between the time length $\alpha_i T$ of the recording pulse and the time length $\beta_i T$ of the cooling pulse) on a medium is set equal to the case of the high linear velocity recording, the time pulse length $(\alpha_i T)$ and the length $(\beta_i T)$ between the pulses become longer in inverse proportion to the case of the high linear velocity recording at the time of recording at a low linear velocity. This is because a product $(V \times T)$ of a recording linear velocity V and a clock period T is always constant and the clock period T therefore becomes longer in inverse proportion to the recording linear velocity V.

However, as a result of experiments by the inventor of the present invention, it turned out that the cooling rate tended to decrease at the low linear velocity recording when the position of light irradiation (the relation between the time length $\alpha_i T$ of the recording pulse and the time length $\beta_i T$ of the cooling pulse) on the medium was set equal to the case of the high linear velocity recording. Moreover, it also turned out that the amorphous marks were not formed properly in many cases due to this decrease in the cooling rate. Accordingly, it became apparent that it was necessary to set the cooling pulses longer (to set $\beta_i$ greater) at the low linear velocity recording as compared to recording at the high linear velocity recording. That is, the spatial (time) length on the media corresponding to the interval between the recording pulses (the cooling pulses) needs to be set longer as the linear velocity for recording is lower. This is because there is generally a more significant tendency that the cooling rate becomes slower at the low linear velocity recording.

In this case, as similar to the high linear velocity recording, the spatial lengths on the medium corresponding to the time lengths $\alpha_i T$ ($1 \leq i \leq m$) of the recording pulses need to be set shorter in order to align the mark lengths. As a consequence, the spatial lengths corresponding to the time lengths $\alpha_i T$ ($1 \leq i \leq m$) of the recording pulses become shorter as the linear velocity for recording is lower ($\alpha_i (1 \leq i \leq m)$ becomes smaller as the liner velocity is lower). Moreover, when $\alpha_i$ ($1 \leq i \leq m$) becomes small in terms of all the mark lengths, an adjustable range of ($1 \leq i \leq m$) also becomes smaller when recording the plurality of mark lengths by use of the same divided pulse number m. For this reason, adjustment among the plurality of nT marks may be complicated upon formation of the plurality of nT marks by use of the same divided number m, whereby the lengths of the time lengths $\alpha_i T$ ($1 \leq i \leq m$) of the recording pulses are apt to be insufficient in terms of the short nT marks. Therefore, when recording on a medium designed for high linear velocity recording at a relatively low linear velocity, an effect obtained by the optical recording method applying this embodiment becomes more significant.

Specifically, in the optical recording method of forming the plurality of recording marks having the different time lengths nT by use of the same divided pulse number m, the average value of $Pw_i$ at the time periods of $\alpha_i T$ ($1 \leq i \leq m$) for forming the recording mark having the longest nT among the plurality of recording marks is defined as $Pw_{long}$, and on the other hand, the average value of $Pw_i$ at the time periods of $\alpha_i T$ ($1 \leq i \leq m$) for forming the recording mark having the shortest nT is defined as $Pw_{short}$. Then, there is provided m satisfying $Pw_{short} > Pw_{long}$.

(Preferred Aspect Common to Both of High Velocity Recording and Low Velocity Recording)

(1) Divided Number m Applying Optical Recording Method Adopting the Embodiment)

When using the above-described optical recording method, $Pw_{short} > Pw_{long}$ may be satisfied in terms of all the divided numbers m. It is preferable to apply this rule to some of the divided numbers m. To be more precise, it is particularly preferable to satisfy $Pw_{short} > Pw_{long}$ when m=1 and/or m=2. The reason is as follows.

In terms of the shortest recording mark among the plurality of recording mark lengths to be recorded at m=2 or m=1, it is necessary to set DT shorter than that of the longer recording marks in order to adjust the lengths of the recording mark. Meanwhile, when m is equal to or above 3, it is possible to adjust the recording mark lengths by use of $\beta_i T$ (i≠1), and there is a higher degree of freedom. Here, as a result of the experiment, degradation in the characteristic of recording quality tends to become more prominent in the case of shortening $\beta_1 T$ as compared to the case of shortening $\beta_T$ (i≠1). This is because the cooling rate at the portion where the front end pulse is applied (the pulse at the $\alpha_i T$ portion) is determined mainly by the length of $\beta_1 T$, whereby the cooling rate for forming the front end portion of the recording mark runs insufficient when shortening $\beta_1 T$, and recrystallization after melting the phase-change recording layer is apt to occur at an anterior end portion (on the side where the front end recording pulse is applied) of the recording mark. Now, as a consequence, the front end portion of the recording mark tends to be formed into an undesired shape (to degrade a jitter characteristic). Therefore, when the divided number is as small as m=2 or m=1 and it is necessary to ensure the length of $\beta_1 T$ to some extent, the tendency of the insufficient recording power for forming the short recording mark by use of the same divided number is increased. In such a case, there is great significance to use the optical recording method applying this embodiment.

(2) Preferable Aspect of Method of Setting Recording Power $Pw_i$ (1≦i≦m)

To simplify design of an electronic circuit for controlling generation of pulse sequences and to ensure life of a light source for laser beam irradiation, it is preferable to set $Pw_i$ (1≦i≦m) as described below.

Specifically, upon formation of the plurality of recording marks having the different lengths by use of the same divided number m, the m pieces of $Pw_i$ in the range of 1≦i≦m for forming the recording mark having the longest nT among the recording marks having the plurality of time lengths of nT are set to the constant value of $Pw_1$. On the contrary, among the m pieces of $Pw_i$ in the range of 1≦i≦m for forming the recording mark having the shortest nT among the recording marks having the plurality of time lengths of nT, at least part of the $Pw_i$ values are set to $Pw_0$ and the rest of the $Pw_i$ values are set to $Pw_1$. Then, $Pw_0 > Pw_1$ is fulfilled. It is preferable to apply the above-described setting because frequent changes of the $Pw_i$ values may not only complicate the design of the control circuit for pulse generation, but also reduce the life of the light source for the laser beam.

Here, upon formation of the shortest recording mark, the preferable value i (1≦i≦m) for setting the recording power to $Pw_0$, or in other words, the preferable $\alpha_i T$ value for setting the recording power to $Pw_0$ is equivalent to the recording pulse applying the smallest $\alpha_i T$ value among the $\alpha_i T$ values in the range of 1≦i≦m. In the recording pulse applying the smallest $\alpha_i T$ value, the melting of the recording layer tends to be insufficient. Accordingly, the recording power may be set as large as $Pw_0$. In addition, the increase in the recording power in terms of the recording pulse applying the smallest $\alpha_i T$ value also brings about an effect to accelerate the cooling rate. Because, the short $\alpha_i T$ period means a shorter time period for thermal diffusion to the surroundings when a temperature is rising, and thermal distribution at the time of reaching the maximum temperature becomes spatially steep. Moreover, by increasing the recording power, it is possible to raise the temperature nearly equal to that of a pulse having a longer $\alpha_i T$ period.

Here, a size of a recrystallized region at a rear end portion of the mark is changed by changing the length of $\beta_m T$ which is the time length of the last cooling pulse. Although this is effective to adjust the mark length, it is likely that a retrieved waveform tends to be distorted.

In the case of using the optical recording method applying this embodiment when the divided pulse number m is m=1 and/or m=2, it is possible to form the recording marks having excellent recording quality by setting the recording power at $\alpha_1 T$ to $Pw_0$.

In the optical recording method applying this embodiment, upon formation of the recording marks of the plurality of nT having the different lengths by use of the same divided number m, it is even more preferable to set all the m pieces of $Pw_i$ in the range of 1≦i≦m upon formation of the recording mark having the shortest nT among this plurality of recording marks equal to Pw0. By applying the above-described setting, it is possible to further simplify the control circuit for pulse generation.

(3) Relation between $Pw_{short}$ and $Pw_{long}$

In the optical recording method applying this embodiment, the average values of the recording power in terms of each of the mark lengths apply at least two types of values, and a higher one of the applied recording power is $Pw_{short}$. Although it is effective as long as $Pw_{short}$ is greater than $Pw_{long}$, $Pw_{short}$ is set preferably equal to or above 1.05 times, more preferably equal to or above 1.1 times, or even more preferably equal to or above 1.15 times as large as $Pw_{long}$. In the meantime, since the laser life is reduced if the recording power is too large, $Pw_{short}$ is set preferably equal to or below 2 times, more preferably equal to or below 1.6 times, or even more preferably equal to or below 1.4 times as large as $Pw_{long}$.

Meanwhile, in the optical recording method applying this embodiment, when the m pieces of $Pw_i$ in the range of 1≦i≦m for forming the recording mark having the longest nT among the plurality of recording marks having the different lengths of nT are respectively set to the constant value of $Pw_1$, while at least part of the $Pw_i$ values among the m pieces of $Pw_i$ in the range of 1≦i≦m for forming the recording mark having the shortest nT are set to $Pw_0$ and the rest of the $Pw_i$ values are set to $Pw_1$, the relation between $Pw_0$ and $Pw_1$ may be set similar to the foregoing. Specifically, although it is effective as long as $Pw_0$ is greater than $Pw_1$, $Pw_0$ is set preferably equal to or above 1.05 times, more preferably equal to or above 1.1 times, or even more preferably equal to or above 1.15 times as large as $Pw_1$. In the meantime, since the laser life is reduced if the recording power is too large, $Pw_0$ is set preferably equal to or below 2 times, more preferably equal to or below 1.6 times, or even more preferably equal to or below 1.4 times as large as $Pw_1$. Moreover, in the optical recording method applying this embodiment, the relation between $Pw_0$ and $Pw_1$ may be also set similar to the foregoing in the case of setting all the m pieces of the recording power $Pw_i$ in the range of 1≦i≦m upon formation of the recording mark having the shortest nT among the recording marks having the different lengths of nT equal to Pw0.

(Particularly Preferable Aspect of Optical Recording Method Applying the Embodiment)

When recording at a relatively low linear velocity on a phase-change recording medium which allows a high data transfer rate, for example, the inventor of the present invention has found out that there may be a case where it is difficult to obtain an excellent recording characteristic by directly using a recording method optimized for high velocity recording. As a result of investigating the cause, it turned out that only the characteristics of specific mark lengths (particularly marks having small n values) are deteriorated by performing the low velocity recording in accordance with the recording by use of the optimal recording power at the time of high velocity recording. The inventor has found out that an appropriate recording pulse waveform should be selected and recording power of a recording pulse for recording these specific mark lengths should be raised in order to improve the characteristics of these specific mark lengths (particularly the marks having the small n values).

Specifically, when recording on the phase-change recording medium which allows the high data transfer rate, by using two types of recording linear velocities $V_{min}$ and $V_{max}$ that satisfy $V_{max} > V_{min}$, there is provided m satisfying $Pw_{short} > Pw_{long}$ at the recording linear velocity $V_{min}$. In this way, the effect to be obtained by the optical recording method applying this embodiment will be more significantly exhibited.

In the case of the phase-change recording medium which allows the high data transfer rate, the optical recording method is usually optimized in the first place as appropriate to obtain the excellent recording quality at the high velocity recording (the recording linear velocity $V_{max}$) in order to simplify the design of the electronic circuit for controlling generation of the recording pulses and thereby to extend the life of the light source for the laser beam. However, when the optical recording method optimized for the high velocity recording is applied to the low linear velocity, the recording pulse tends to be shortened ($\alpha_i$ tends to be shortened) because it is necessary to lengthen the cooling pulse (to increase $\beta_i$) as described above in "Recording at Low Linear Velocity". Therefore, at the low linear velocity recording, it is necessary to set $\alpha_i$ to be even shorter when forming the recording mark having the plurality of lengths by use of the same divided pulse number m. For this reason, the average recording power $Pw_{short}$ for obtaining the recording marks having the excellent recording quality tends to be insufficient. Accordingly, there is great significance to set $Pw_{short}$ larger than $Pw_{long}$ at the low linear velocity recording.

Here, in the above-described example, there is an advantage that it is possible to further simplify the design of the electronic circuit for controlling generation of the recording pulses by setting the $Pw_i$ values to a constant value in terms of the recording marks of all the lengths to be formed by the same divided number m at the high velocity recording (the recording linear velocity $V_{max}$).

Meanwhile, in terms of the relation between $V_{min}$ and $V_{max}$, phenomena requiring the shorter $\alpha_i$ at $V_{min}$ occur more frequently as the difference between $V_{min}$ and $V_{max}$ becomes larger. Therefore, there is great significance to use the optical recording method applying this embodiment in the case of $V_{min}$ which causes the large difference between $V_{min}$ and $V_{max}$. To be more precise, by setting the relation between $V_{min}$ and $V_{max}$ to satisfy $V_{max} \geq 2V_{min}$, the effect to be obtained by the optical recording method applying this embodiment will be more significantly exhibited.

Here, as described above, it is favorable to set the difference between $V_{min}$ and $V_{max}$ as large as possible. Therefore, it is not necessary to define the upper limit of $V_{max}$ in particular. However, from a practical viewpoint, the upper limit of $V_{max}$ is set approximately 1000 times or 100 times as large as $V_{min}$.

(General Issues of Optical Recording Method Applying the Embodiment)

(1) Values of $\alpha_i$ and $\beta_i$

The values of $\alpha_i$ and $\beta_i$ are the values which vary depending on the i value, the mark length, the recording linear velocity, and the like. Since the optical recording method configured to record the plurality of mark lengths by use of the pulse sequences having the same divided number is assumed in the present invention, an average period of $(\alpha_i + \beta_i)T$ satisfying $1 \leq i \leq m-1$ becomes larger than the clock period T. However, when it is too large, amorphous portions attributable to the pulse sequence for forming one mark are optically separated. Therefore, although an average value of $(\alpha_i + \beta_i)$ in the range of $1 \leq i \leq m-1$ is usually set equal to or above 1, the value is set preferably equal to or above 1.25, more preferably equal to or above 2, or even more preferably equal to or above 2.5. On the contrary, although the average value of $(\alpha_i + \beta_i)$ in the range of $1 \leq i \leq m-1$ is usually set equal to or below 6, the value is set preferably equal to or below 5, or more preferably equal to or below 4.5.

Meanwhile, although the average value of $\alpha_i$ ($1 \leq i \leq m$) is set to a real number greater than 0 at the overwritable maximum linear velocity for the recording medium having the rewritable phase-change recording layer, the value is set preferably equal to or above 0.8, more preferably equal to or above 1, or even more preferably equal to or above 1.2. On the contrary, although the average value of $\alpha_i$ ($1 \leq i \leq m$) is usually set equal to or below 5, the value is set preferably equal to or below 4, more preferably equal to or below 3, or even more preferably equal to or below 2. The value of $\alpha_i$ is reduced in the case of reducing the recording linear velocity relative to the overwritable maximum linear velocity. In this case, a preferable range of $\alpha_i$ is a value obtained by reducing a preferable range of $\alpha_i$ in the overwritable maximum linear velocity recording in proportion to the linear velocities.

The value $\alpha_i$ ($1 \leq i \leq m-1$) is set to a real number greater than 0. Meanwhile, the upper limit of $\beta_i$ ($1 \leq i \leq m-1$) is necessarily determined by a relation between the above described $(\alpha_i + \beta_i)$ value and the $\alpha_i$ value. Although $\beta_i$ ($1 \leq i \leq m-1$) is usually set equal to or below 5, the value is set preferably equal to or below 4, or more preferably equal to or below 3.5.

Crystallization of the amorphous mark existing prior to overwriting may be insufficient if $\beta_m$ is too large, and recrystallization of the recording layer after melting may intensify and the recording characteristic may be deteriorated if $\beta_m$ is too small. Although an average value of $\beta_m$ at the overwritable maximum linear velocity for the rewritable phase-change recording medium is set to a real number greater than 0, the value is set preferably equal to or above 0.2, or more preferably equal to or above 0.5. Meanwhile, although the average value of $\beta_m$ is usually set equal to or below 3, the value is set equal to or below 2, or more preferably equal to or below 1.5. The value of $\beta_m$ is increased in the case of reducing the recording linear velocity relative to the overwritable maximum linear velocity. In this case, a preferable range of $\beta_m$ is a value obtained by increasing a preferable range of $\beta_m$ in the overwritable maximum linear velocity recording in inverse proportion to the linear velocities.

(2) Bias Power Pb, Erasing Power Pe, and Recording Power $Pw_i$

Small bias power Pb is preferable in light of increasing the cooling rate. Therefore, it is preferable to set the bias power Pb as close as possible to 0 unless there is a problem in focusing or tracking servo. A relation $Pb/Pw_i \leq 0.2$ is established in the range of $1 \leq i \leq m$. However, a $Pb/Pw_i \leq 0.1$ is preferred herein. Usually, Pb is set to about the same value as the retrieving power.

In the optical recording method applying this embodiment, intensity of the recording light is not particularly defined in terms of the intervals other than $\alpha_i$ T and $\beta_i$ T. For example, the erasing power Pe is applied in the case of the rewritable phase-change optical recording medium. In the overwritable phase-change medium defining the crystalline state as an unrecorded or erased state and defining the amorphous state as the recording mark, the erasing power Pe is a temperature which raises the temperature of the recording layer equal to or above the crystallization temperature but generally equal to or below the melting point. In this case, usually, $Pe/Pw_i$ in the range of $1 \leq i \leq m$ is preferably set equal to or above 0.1. Meanwhile, usually, $Pe/Pw_i$ is set preferably equal to or below 0.6 or more preferably equal to or below 0.4. In the above-described range, it is particularly preferable to set the $Pe/Pw_i$ in the range from 0.2 to 0.4 inclusive. If this ratio falls below the above-described range, there may be a case where the erasing power is too low and the amorphous mark is not perfectly erased. On the contrary, if this ratio exceeds the above-described range, there may be a case where a portion on which Pe was applied is formed into the amorphous state after melting.

Here, the values of the recording power $Pw_i$ ($1 \leq i \leq m$), Pe, and Pb do not always have to be constant like direct current. For example, it is possible to stabilize the operation of the laser by adding high frequency superposition in a period approximately equal to or below 1/10 of the clock period T. The values of $Pw_i$ ($1 \leq i \leq m$), Pe, and Pb in this case will be equal to average values thereof.

The recording power $Pw_i$ is usually set equal to or above 4 mW and equal to or below 60 mW. For example, in terms of a laser having a wavelength of about 400 nm, $Pw_i$ is generally set in a range approximately from 4 mW to 15 mW. For example, in terms of a laser having a wavelength of about 650 nm, $Pw_i$ is generally set in a range approximately from 10 mW to 50 mW. In addition, for example, in terms of a laser having a wavelength of about 780 nm, $Pw_i$ is generally set in a range approximately from 10 mW to 60 mW. Obviously, the recording power is the value which can vary depending on recording conditions, a disc configuration, and performance of the laser.

The upper and lower limits of the value of the bias power Pb and the value of the erasing power Pe are necessarily determined based on the value of the recording power $Pw_i$.

(Optical Recording Device)

An optical recording device for embodying the optical recording method applying this embodiment will be described below.

In the optical recording method applying this embodiment, the recording pulses $\alpha_i T$ and the cooling pulses $\beta_i T$ are alternately generated in accordance with the timing charts shown in FIG. 4A to FIG. 4C. Moreover, when forming the recording marks having the plurality of lengths (nT) by use of the same divided number m, the average value of the recording power $Pw_i$ at the time of forming the recording mark having the longest nT among the recording marks having the plurality of lengths (nT) is defined as $Pw_{long}$, and the average value of the recording power $Pw_i$ at the time of forming the shortest recording mark is defined as $Pw_{short}$. Then, there is provided m satisfying $Pw_{short} > Pw_{long}$.

Here, when outputting an actual divided recording pulse beam as shown in FIG. 4A to FIG. 4C from a laser diode, the following operation usually takes place. Specifically, an integrated circuit output at a logical level for generating a gate signal according to the timing charts shown in FIG. 4A to FIG. 4C is inputted to a laser driver circuit. Then, the laser driver circuit controls a large current for driving the laser, controls an optical output from the laser diode, and generates the recording power $Pw_i$, the bias power Pb, and the erasing power Pe. In this way, control of the divided recording pulse beam as shown in FIG. 4A to FIG. 4C is achieved.

FIG. 5 is a view showing an example of the optical recording device for embodying the optical recording method applying this embodiment. FIG. 5 shows an optical recording device 2000 serving as an optical disc recording and retrieving device for recording computer data.

A configuration of the optical recording device 2000 shown in FIG. 5 will be described. An I/F 2001 is an interface circuit for delivering and receiving data to and from a host computer (not shown). A modulation circuit 2002 is a circuit for performing code modulation of the data to be recorded. A divided recording pulse generation control circuit 2003 is a circuit for generating a pulse sequence for divided recording based on a signal modulated by the modulation circuit 2002. An LD driver 2004 is a driver for controlling an output of a laser beam based on a control signal at a logical level which is outputted from the divided recording pulse generation control circuit 2003. An LD 2005 is a semiconductor laser (LD) constituting a light source of the optical recording device 2000. A beam splitter 2006 is an optical element for outputting the laser beam from the LD 2005 onto an optical disc 2007 which is a recording medium as an outgoing beam and for separating reflected light from the optical disc 2007. An object lens 2009 is an optical element for focusing the laser beam onto the optical disc 2007. A PD 2008 is a photodetector for receiving the reflected light from the optical disc 2007 guided by the beam splitter 2006 and for converting the reflected light into an electric signal. A retrieval circuit 2010 is a circuit for detecting a signal recorded on the optical disc 2007 from the electric signal outputted from the PD 2008 and for generating a reference clock (having the period T) for this signal. A demodulation circuit 2011 is a circuit for demodulating the data recorded on the optical disc 2007, which are retrieved by the retrieval circuit 2010. A control microcomputer 2012 is a computer for controlling the entire optical recording device 2000. A spindle motor 2013 is a driving device for rotating the optical disc 2007.

Next, operations of the optical recording device 2000 will be described.

The recording data to be recorded on the optical disc 2007 adopts a mark length modulation recording method configured to convert sequential data subjected to code modulation by the modulation circuit 2002 further into serial NRZI (Non Return to Zero Inverted) signals. An operating clock in this case is equivalent to the reference clock which is outputted from the retrieval circuit 2010. The retrieval circuit 2010 usually extracts the reference clock by detecting a preformatted meandering groove (wobble) signal of a guide groove on the optical disk 2007. For this reason, the reference clock corresponding to the recording linear velocity is obtained.

The divided recording pulse generation control circuit 2003 performs division and generation of the divided recording pulse for forming the nT mark length. This divided recording pulse is inputted to the LD driver 2004, and a large current for driving the laser is controlled by the LD driver 2004. Then, the LD driver controls an optical output from the LD 2005 and generates the recording power $Pw_i$, the bias power Pb, and the erasing power Pe. In this way, control of the divided recording pulse beam is achieved as shown in FIG. 4A to FIG. 4C.

Next, a concrete method of carrying out the optical recording method applying this embodiment by use of the above-described optical recording device 2000 will be explained.

In this embodiment, the optical recording device 2000 is configured to form recording marks having a plurality of time lengths nT by use of the same divided pulse number m. Moreover, on the assumptions that the average value of the recording power $Pw_i$ at the time periods of $\alpha_i T$ ($1 \leq i \leq m$) for forming the recording mark having the longest nT among the plurality of recording marks having the time lengths of nT is defined as $Pw_{long}$ and that the average value of the recording power $Pw_i$ at the time periods of $\alpha_i T$ ($1 \leq i \leq m$) for forming the recording mark having the shortest nT among the plurality of recording marks having the time lengths of nT is defined as $Pw_{short}$, the optical recording device 2000 may be configured to provide m which satisfies $Pw_{short} > Pw_{long}$.

The above-described configuration can be achieved for instance by inputting information such as the divided number m, the mark lengths nT, $Pw_{short}$, $Pw_{long}$ and the like from the control microcomputer 2012 to the divided recording pulse generation control circuit 2003 as a selection signal 2020 (see FIG. 5). Alternatively, it is also possible to record information on favorable m, n, $Pw_{short}$, and $Pw_{long}$ for the applicable optical disc 2007 on the optical disc 2007 by use of a prepit sequence or the like. Then, this information is read out prior to recording on the optical disc 2007. Thereafter, desired recording on the optical disc 2007 may be carried out by use of the information thus read out.

Meanwhile, in this embodiment, it is preferable to configure the optical recording device 2000 to render the above-described m value satisfying $Pw_{short} > Pw_{long}$ equal to 1 and/or 2.

The above-described configuration can be achieved for instance by inputting information concerning relations among the divided number m, $Pw_{short}$ and $Pw_{long}$ from the control microcomputer 2012 to the divided recording pulse generation control circuit 2003 as the selection signal 2020 (see FIG. 5). Alternatively, it is also possible to record information on favorable m, $Pw_{short}$, and $Pw_{long}$ for the applicable optical disc 2007 on the optical disc 2007 by use of a prepit sequence or the like. Then, this information is read out prior to recording on the optical disc 2007. Thereafter, desired recording on the optical disc 2007 may be carried out by use of the information thus read out.

Meanwhile, in this embodiment, it is preferable to configure the optical recording device 2000 to use the two types of the recording linear velocity $V_{min}$ and the recording linear velocity $V_{max}$ (where $V_{max} > V_{min}$). Here, it is preferable to provide m which satisfies $Pw_{short} > Pw_{long}$ at the recording linear velocity $V_{min}$.

Moreover, in this embodiment, it is more preferable to configure the optical recording device 2000 to allow a relation between the recording linear velocity $V_{min}$ and the recording linear velocity $V_{max}$ to satisfy $V_{max} \geq 2V_{min}$.

The above-described configuration can be achieved for instance by setting the data of $V_{min}$ and $V_{max}$ on the control microcomputer 2012 (see FIG. 5). Alternatively, it is also possible to record information about favorable $V_{min}$ and $V_{max}$ for the applicable optical disc 2007 on the optical disc 2007 by use of a prepit sequence or the like. Then, this information is read out prior to recording on the optical disc 2007. Thereafter, desired recording on the optical disc 2007 may be carried out by use of the information thus read out.

Meanwhile, in this embodiment, it is preferable to configure the optical recording device 2000 to set m pieces of the recording power $Pw_i$ in the range of $1 \leq i \leq m$ for forming the recording mark having the longest nT respectively equal to $Pw_1$, among the recording marks having the plurality of the time lengths nT to be formed by use of the same divided number m. Moreover, it is possible to set at least part of the recording power $Pw_i$ out of m pieces of the recording power $Pw_i$ in the range of $1 \leq i \leq m$ for forming the recording mark having the shortest nT equal to $Pw_0$, among the recording marks having the plurality of the time lengths nT, and to set the remaining pieces of the recording power $Pw_i$ equal to $Pw_1$. Then it is preferable to configure a relation between $Pw_0$ and $Pw_1$ to satisfy $Pw_0 > Pw_1$.

Moreover, in this embodiment, it is more preferable to configure the optical recording device 2000 to set all the m pieces of the recording power $Pw_i$ in the range of $1 \leq i \leq m$ for forming the recording mark having the shortest nT equal to $Pw_0$, among the recording marks having the plurality of the time lengths nT.

The above-described configuration can be achieved for instance by setting the data of $Pw_1$ and $Pw_0$ in the range of $1 \leq i \leq m$ on the control microcomputer 2012 (see FIG. 5). Alternatively, it is also possible to record information about favorable $Pw_0$ and $Pw_1$ for the applicable optical disc 2007 on the optical disc 2007 by use of a prepit sequence or the like. Then, this information is read out prior to recording on the optical disc 2007. Thereafter, desired recording on the optical disc 2007 may be carried out by use of the information thus read out.

(Optical Recording Medium)

The optical recording method applying this embodiment is preferably applied to an optical recording medium, which includes a phase-change recording layer configured to record information by use of a crystalline state and an amorphous state and to be able to rewrite the information.

As a concrete example of the optical recording medium including the phase-change recording layer, it is possible to cite an optical recording medium including a multilayer structure having a lower protective layer, a recording layer, an upper protective layer, a reflective layer, and a protective coating layer which are formed in this order on a substrate. This optical recording medium is an optical recording medium (an optical recording medium of a substrate surface incident type) configured to perform recording and retrieving of signals by applying a laser beam through the substrate. Meanwhile, as another concrete example of the optical recording medium including the phase-change recording layer, it is possible to cite an optical recording medium including a multilayer structure having a reflective layer, a lower protective layer, a recording layer, an upper protective layer, and a protective coating layer which are formed in this order on a substrate. This optical recording medium is an optical recording medium (an optical recording medium of a film surface incident type) configured to perform recording and retrieval of signals by applying a laser beam through the upper protective layer. The optical recording medium of the film surface incident type is configured to perform recording and retrieving of signals by applying a laser beam from the second protective layer side instead of passing the beam through the substrate. For this reason, it is possible to closely set a distance between the recording layer and an optical head within several hundred micrometers. By using an object lens having a numerical aperture equal to or above 0.7, it is possible to improve recording density of the medium.

Note that the respective multilayer structures of the optical recording medium of the substrate surface incident type and the optical recording medium of the film surface incident type described above are merely examples. For instance, it is possible to provide an interface layer between the protective layer and the reflective layer in any of the optical recording medium of the substrate surface incident type and the optical recording medium of the film surface incident type. Meanwhile, a subbing layer may be provided between the substrate and the reflective layer in the optical recording medium of the film surface incident type, for example.

What is preferred in this embodiment is a rewritable phase-change optical recording medium which allows a high data transfer rate. Such an optical recording medium can be realized usually by applying a recording material having a high crystallization rate to the recording layer.

Now, the recording layer, the substrate, the protective layer, the reflective layer, and the protective coating layer are taken as examples, and the respective layers will be described.

(1) Recording Layer

A material allowing repetitive recording, which includes compounds of the groups of GeSbTe, InSbTe, AgSbTe, and AgInSbTe, for example, is selected for the material of the recording layer. Among these compounds, a composition including a pseudo-binary alloy of $Sb_2Te_3$ and GeTe as a main component, or more specifically a $\{(Sb_2Te_3)_{1-\alpha}(GeTe)_\alpha\}_{1-\beta}Sb_\beta$ composition (where $0.2 \leq \alpha \leq 0.9$, $0 \leq \beta \leq 0.1$) is often selected. Alternatively, a composition including Sb as a main component which contains Sb equal to or above 50 atomic percent is often selected.

It is particularly preferable that the optical recording medium used in this embodiment apply a composition including Sb as a main component to the recording layer in order to increase the crystallization rate. Note that the expression "including Sb as a main component" in this embodiment means that the content of Sb is equal to or above 50 atomic percent in terms of the entire recording layer. The reason for including Sb as the main component is that Sb in the amorphous state can be crystallized at a very high rate and it is therefore possible to crystallize an amorphous mark in a short period of time. For this reason, it is easy to erase a recording mark in the amorphous state. Nevertheless, as compared to solely using Sb, it is preferable to use an additive element together with Sb for promoting formation of the amorphous state and for enhancing long-term stability of the amorphous state. To promote formation of the amorphous state of the recording layer and to enhance long-term stability of the amorphous state, the content of the additive element is set usually equal to or above 1 atomic percent, preferably equal to or above 5 atomic percent, or more preferably equal to or above 10 atomic percent. Meanwhile, the content is set usually equal to or below 50 atomic percent.

The additive element for promoting formation of the amorphous state and for enhancing long-term stability of the amorphous state also possesses an effect to raise the crystallization temperature. As the additive element, it is possible to use Ge, Te, In, Ga, Sn, Pb, Si, Ag, Cu, Au, rare-earth elements, Ta, Nb, V, Hf, Zr, W, Mo, Cu, Cr, Co, N, O, Se, and the like. Among these additive elements, it is preferable to use at least one selected from the group consisting of Ge, Te, In, Ga, and Sn from the viewpoints of promoting formation of the amorphous state, enhancing long-term stability of the amorphous state, and raising the crystallization temperature. It is particularly preferable to use at least Ge and/or Te, or to use at least one of In, Ga, and Sn.

As described above, in the optical recording medium used in this embodiment, it is particularly preferable to apply Sb together with Ge and/or Te as the material of the recording layer. The content of Ge or Te is set preferably in a range from 1 atomic percent to 30 atomic percent inclusive, respectively. That is, it is preferable to contain each of Ge and Te in the range from 1 atomic percent to 30 atomic percent inclusive independently. It is to be noted, however, that the content of Sb is set equal to or above 50 atomic percent in the case of using Sb as the main component of the recording layer. For this reason, when including Ge and Te in the recording layer together with Sb, the total amount of Ge and Te will not exceed 50 atomic percent.

The content of each of Ge and Te in the recording layer is set more preferably equal to or above 3 atomic percent. By setting this range, the effect to stabilize the amorphous marks will be fully exhibited. Meanwhile, the content of each of Ge and Te in the recording layer is set more preferably equal to or below 20 atomic percent, or even more preferably equal to or below 15 atomic percent. By setting this range, it is possible to favorably suppress a tendency that the amorphous state becomes too stabilized and crystallization is delayed by contraries. In addition, it is possible to suppress noises attributable to light scattering at crystal grain boundaries.

The above-described composition including Sb as the main component can be classified into two categories depending on the amount of Te contained in the recording layer. One of the categories is a composition containing Te in the amount equal to or above 10 atomic percent. The other category is a composition containing Te in the amount below 10 atomic percent (including the case of not containing Te).

One of the above-described compositions including Sb as the main component is a composition applying as the main component an alloy which includes more excessive Sb than a $Sb_{70}Te_{30}$ eutectic composition while containing Te in the amount approximately equal to or above 10 atomic percent. This recording layer material will be hereinafter referred to as a SbTe eutectic. Here, Sb/Te is set preferably equal to or above 3, or more preferably equal to or above 4.

As the above-described other composition including Sb as the main component, it is possible to cite the following composition. Specifically, it is possible to cite the composition of the recording layer which contains less than 10 atomic percent of Te and further contains Ge as an essential component while including Sb as the main component. As a concrete example of the composition of the above-described recording layer, it is possible to favorably cite an alloy including a eutectic alloy having a composition in the vicinity of $Sb_{90}Ge_{10}$ as the main component while including less than 10 atomic percent of Te (this alloy will be referred to as a SbGe eutectic in this specification).

The composition having the amount of addition of Te below 10 atomic percent will possess properties as the SbGe eutectic instead of the SbTe eutectic. In this SbGe eutectic alloy, the crystal grain sizes in a polycrystalline state after initial crystallization is relatively fine in spite of the high Ge content around 10 atomic percent. Therefore, the crystalline state tends to be a single phase which causes low noises. In the SbGe eutectic alloy, Te is merely added as an auxiliary element and does not constitute an essential element.

In the SbGe eutectic alloy, it is possible to accelerate the crystallization rate by relatively raising a Sb/Ge ratio, and thereby to erase the amorphous marks favorably by recrystallization.

In the case of applying the composition including Sb as the main component to the recording layer, defining the crystalline state as the unrecorded or erased state, and performing the recording by forming the amorphous marks, it is extremely important to improve cooling efficiency. The reason is as follows.

Specifically, in order to deal with high velocity recording, Sb is added to the recording layer including Sb, such as the SbTe eutectic or the SbGe eutectic as the main component, more excessively than the eutectic point of $Sb_{70}Te_{30}$ or vicinity of the eutectic point of $Sb_{90}Ge_{10}$. Accordingly, the crystallization rate is enhanced by accelerating a crystal growth rate instead of a crystal nucleation rate. For this reason, in these recording layers, it is preferable to suppress variation of the amorphous mark due to recrystallization (a decrease in size of the amorphous mark in comparison with a desired size) by accelerating the cooling rate for the recording layers. Therefore, it is important to cool down the recording layer quickly to form the amorphous mark reliably after melting the recording layer. In other words, it is extremely important to improve the cooling efficiency for the recording layers. For this reason, in terms of the above-described composition of the recording layer, it is particularly preferable to apply either Ag or an Ag alloy having a heat dissipation property to the reflective layer. Moreover, there is great significance to use the optical recording method of this embodiment for the optical recording medium having the recording layer that requires improvement in the cooling efficiency at the time of recording.

In the optical recording medium used in this embodiment, it is particularly preferable that the recording layer applying the composition including Sb such as the above-described SbTe eutectic as the main component further include at least one of In, Ge, and Sn, and that each of the contents of In, Ge, and Sn in the recording layer be set in a range from 1 atomic percent to 30 atomic percent inclusive.

Now, a concrete example of the composition including Sb as the main component will be described further.

As the composition including Sb as the main component, in the first place it is possible to favorably cite a SbTe eutectic composition including a $(Sb_xTe_{1-x})_{1-y}M_y$ (where $0.6 \leq x \leq 0.9$, $0 \leq y \leq 0.45$, and M is at least one selected from the group consisting of Ge, Ag, In, Ga, Zn, Sn, Si, Cu, Au, Pd, Pt, Pb, Cr, Co, O, S, Se, V, Nb, and Ta) alloy as the main component. Here, the above-described composition formula represents the composition by use of the atomic ratio. Therefore, x=0.6 means 60 atomic percent, for example.

In the above-described $(Sb_xTe_{1-x})_{1-y}M_y$ composition, it is particularly preferable from the viewpoints of recording characteristic such as overwrite characteristic that M is applied by being solely or combinationally selected from Ge, Ga, Ag, Sn or In.

In the above-described $(Sb_xTe_{1-x})_{1-y}M_y$ composition, x is set usually equal to or above 0.6, more preferably equal to or above 0.7, or even more preferably equal to or above 0.75. Meanwhile, x is set usually equal to or below 0.9. On the other hand, y is set usually equal to or above 0, more preferably equal to or above 0.01, or even more preferably equal to or above 0.03. Meanwhile, y is set usually equal to or below 0.45, or preferably equal to or below 0.4. By setting x and y in the above-described ranges, is it possible to obtain the recording layer compatible with the high velocity recording.

A composition using Ge as M in the above-described $(Sb_xTe_{1-x})_{1-y}M_y$ composition will be described further. As for this composition, it is preferable to use a composition expressed by $Ge_y(Sb_xTe_{1-x})_{1-y}$ (where $0.01 \leq y \leq 0.06$ and $0.82 \leq x \leq 0.9$), which includes as a parent body a $Sb_{70}Te_{30}$ alloy containing a considerably excessive amount of Sb based on a $Sb_{70}Te_{30}$ eutectic composition and further includes Ge. The amount of Ge is set preferably equal to or above 0.01 or particularly equal to or above 0.02 as the y value in $Ge_y(Sb_xTe_{1-x})_{1-y}$. Meanwhile, in the SbTe eutectic composition having the large content of Sb as described above, an intermetallic compound of a GeTe or GeSbTe group may be precipitated and a SbGe alloy may also be precipitated if the amount of Ge is excessive. Accordingly, crystal grains having different optical constants are assumed to be mixed in the recording layer. Then, mixture of these crystal grains may lead to an increase in noises on the recording layer and to an increase in jitter. Moreover, excessive addition of Ge saturates the effect of long-term stability of the amorphous marks. For this reason, the amount of Ge is set usually equal to or below 0.06, preferably equal to or below 0.05, or even more preferably equal to or below 0.04 as the y value in $Ge_y(Sb_xTe_{1-x})_{1-y}$.

It is particularly preferable that the above-described GeSbTe eutectic composition further include In, Ga or Sn. Specifically, it is particularly preferable to use a composition expressed by $Ml_zGe_y(Sb_xTe_{1-x})_{1-y-z}$ ($0.01 \leq z \leq 0.4$, $0.01 \leq y \leq 0.06$, $0.82 \leq x \leq 0.9$, and Ml represents at least one element selected from the group consisting of In, Ga, and Sn). The characteristic is further improved by adding at least one of the elements of the group described above as Ml=In, Ga, and Sn. The elements of In, Ga, and Sn also have effects to increase optical contrast between the crystalline state and the amorphous state, and to reduce jitter. The z value indicating the content of Ml is set usually equal to or above 0.01, preferably equal to or above 0.02, or more preferably equal to or above 0.05. Meanwhile, the z value is set usually equal to or below 0.4, or preferably equal to or below 0.35. By setting this range, the effect of improving the characteristic is favorably exhibited.

It is possible to cite nitrogen, oxygen, and sulfur as an element which can be included in the above-described GeSbTe eutectic composition apart from In, Ga, and Sn. These elements have effects to prevent segregation in repetitive overwriting and to enable fine tuning of the optical characteristic. The contents of nitrogen, oxygen, and sulfur are set preferably equal to or below 5 atomic percent relative to the total amount of Sb, Te, and Ge.

Moreover, it is also possible to allow the above-described GeSbTe eutectic composition to contain Cu, Zr, Hf, V, Nb, Ta, Cr, and Co. A small amount of addition of these elements has effects to raise the crystallization temperature without reducing the crystallization growth rate and to further improve successive stability. However, when the amounts of these elements are excessive, time-lapse segregation attributable to a specific substance and segregation attributable to repetitive overwriting may occur more frequently. Therefore, it is preferable to adjust the amount of addition equal to or below 5 atomic percent, or particularly equal to or below 3 atomic percent. When segregation occurs, stability of the amorphous state, a recrystallization rate, and the like possessed by the recording layer in the beginning may vary and an overwrite characteristic may be deteriorated.

The film thickness of the recording layer is set preferably equal to or above 5 nm in order to obtain sufficient optical contrast and to accelerate the crystallization rate for achieving erasing of the record in a short period. More preferably, the film thickness is set equal to or above 10 nm in order to raise reflectivity sufficiently.

Meanwhile, in order to suppress occurrence of cracks and to obtain the sufficient optical contrast, it is preferable to set the film thickness of the recording layer equal to or below 100 nm, or more preferably equal to or below 50 nm. This is for reducing heat capacity and improving recording sensitivity. Moreover, it is possible to reduce a volume change associated with the phase change by setting the above-described range. Accordingly, it is also possible to reduce an effect of repetitive volume changes of the recording layer attributable to overwriting to the upper and lower protective layers. Eventually, accumulation of irreversible microscopic deformation is suppressed, the noises are reduced, and repetitive overwrite durability is enhanced.

Since requirements against noises are even severer in a high density recording medium such as a rewritable DVD, the film thickness of the recording layer is set more preferably equal to or below 30 nm.

The above-described recording layer can be obtained by subjecting a given alloy target to DC or RF sputtering in an inert gas, or in Ar gas in particular.

Meanwhile, a density of the recording layer is set usually equal to or above 80% of a bulk density, or preferably equal to or above 90% thereof. The bulk density p stated above usually applies an approximate value obtained by the following expression (1). Alternatively, it is possible to fabricate and measure an bulk of an alloy composition constituting the recording layer.

$$\rho = \Sigma m_i \rho_i (1) \quad \text{[Formula 5]}$$

(here, $m_i$ is a molar concentration of each element i, and $m_i \rho_i$ is an atomic mass of the element i.)

In the sputtering film forming method, it is possible to increase the density of the recording layer by reducing pressure of a sputter gas (which is typically a rare gas such as Ar; the case of using Ar will be described below as an example) at the time of film forming or placing the substrate closely to a front surface of the target, and so forth to increase an amount of high-energy Ar to be impinged on to the recording layer. The high-energy Ar usually means Ar ions to be impinged on to the target for a sputtering purpose which partially bounce back and reach the substrate side, or Ar ions existing in the plasma which reach the substrate as a result of acceleration by a sheath voltage on the entire surface of the substrate.

The above-described irradiation effect of the high-energy rare gas is referred to as an atomic peening effect. In the generally applied Ar gas sputtering, Ar is mixed in a sputtered film by the atomic peening effect. It is possible to estimate the degree of the atomic peening effect by use of the amount of Ar in the film. That is, when there is a small amount of Ar, it means that the effect of high-energy Ar irradiation is low. Here, a low-density film is usually formed in this case.

On the contrary, when there is a large amount of Ar, irradiation of the high-energy Ar is stimulated and the density of the film is increased. However, Ar taken into the film will be precipitated as voids at the time of repetitive overwriting, and repetition durability is apt to be deteriorated. Therefore, an electric discharge is performed at an appropriate pressure, which is usually in a range of the $10^{-2}$ Pa to $10^{-1}$ Pa order.

(2) Substrate

Resin such as polycarbonate, acryl or polyolefin, or glass is applicable to the substrate, for example. Among them, the polycarbonate resin is most preferable, because the polycarbonate resin has a track record as the most broadly used material of CD-ROMs and the like, and is also available at a low cost. The thickness of the substrate is set usually equal to or above 0.1 mm, or preferably equal to or above 0.3 mm. Meanwhile, the thickness is set usually equal to or below 20 mm, or preferably equal to or below 15 mm. In general, the thickness of the substrate is set in a range approximately from 0.6 mm to 1.2 mm. In the case of the optical recording medium of the substrate surface incident type, the substrate needs to be transparent with respect to the laser beam because the substrate must allow penetration of the laser beam. On the contrary, in the case of the optical recording medium of the film surface incident type, the substrate does not always have to be transparent.

(3) Protective Layer

The protective layer is used for preventing evaporation and deformation of the recording layer attributable to the phase change of the recording layer and for controlling thermal diffusion attributable to the phase change of the recording layer. The protective layer is usually provided on one of the upper and lower sides of the recording layer, or on each of the upper and lower sides thereof. The protective layer is preferably provided on each of the upper and lower sides of the recording layer. The material of the protective layer is determined in consideration of the refraction index, thermal conductivity, chemical stability, mechanical strength, adhesion, and the like. Generally, oxides, sulfides, nitrides, and carbides of metal or a semiconductor having high transparency and a high melting point, and dielectrics such as fluorides of Ca, Mg, Li, and the like are applicable.

In this case, these oxides, sulfides, nitrides, carbides, and fluorides do not always have to adopt stoichiometric compositions. That is, it is also effective to control the compositions of the above-described oxides and the like or to mix the oxides and the like for controlling the refractive index and other factors. A mixture of the dielectrics is preferable in light of the repetitive recording characteristic. To be more precise, it is possible to cite mixtures of a chalcogen compound of ZnS or a rare-earth sulfide, and a heat-resistant compound such as an oxide, a nitride, a carbide or a fluoride. For instance, preferable examples of the composition of the protective layer include a mixture of a heat-resistant compound containing ZnS as a main component, and a mixture of heat-resistant compound containing a rare-earth sulphate, in particular $Y_2O_2S$ as a main component.

Dielectric materials can be usually cited as the material of the protective layer. As the dielectric materials, it is for instance possible to cite: oxides of elements including Sc, Y, Ce, La, Ti, Zr, Hf, V, Nb, Ta, Zn, Al, Cr, In, Si, Ge, Sn, Sb, Te, and the like; nitrides of elements including Ti, Zr, Hf, V, Nb, Ta, Cr, Mo, W, Zn, B, Al, Ga, In, Si, Ge, Sn, Sb, Pb, and the like; carbides of elements including Ti, Zr, Hf, V, Nb, Ta, Cr, Mo, W, Zn, B, Al, Ga, In, Si, and the like; and so forth. It is also possible to use a mixture of the materials mentioned above. Moreover, as the dielectric materials, it is possible to cite: sulfides, selenides, or tellurides of elements including Zn, Y, Cd, Ga, In, Si, Ge, Sn, Pb, Sb, Bi, and the like; fluorides of elements including Mg, Ca, and the like; and so forth. It is also possible to use a mixture of the materials mentioned above.

Moreover, as concrete examples of the dielectric materials, it is possible to cite $ZnS$—$SiO_2$, SiN, $SiO_2$, $TiO_2$, CrN, $TaS_2$, $Y_2O_2S$, and the like. Among these materials, $ZnS$—$SiO_2$ is widely used in terms of a high film forming rate, small film stress, a small volume change rate attributable to variation in the temperature, and excellent weather resistance. when using $ZnS$—$SiO_2$, a composition ratio $ZnS:SiO_2$ between ZnS and $SiO_2$ is set usually in a range from 0:1 to 1:0, preferably in a range from 0.5:0.5 to 0.95:0.05, or more preferably in a range from 0.7:0.3 to 0.9:0.1. It is most preferable to set $ZnS:SiO_2$ equal to 0.8:0.2.

In light of the repetitive recording characteristic, it is preferable to set the film density of the protective layer equal to or above 80% of a bulk state from the viewpoint of the mechanical strength. When using the mixture of the dielectrics, the theoretical density according to the above-described general expression (1) will be used as the bulk density.

In general, the thickness of the protective layer is set usually in a range from 1 nm to 500 nm inclusive. By setting the thickness equal to or above 1 nm, it is possible to ensure the effect to prevent deformation of the substrate and the recording layer sufficiently. In this way, the protective layer can play its role sufficiently. Meanwhile, by setting the film thickness of the protective layer equal to or below 500 nm, internal stress of the protective layer itself, a difference in an elasticity characteristic from the substrate, and the like become significant while the protective layer plays its role sufficiently. Accordingly, it is possible to prevent occurrence of cracks.

In particular, when the protective layer (which may be referred to as a lower protective layer) is provided between the substrate and the recording layer, the lower protective layer has to suppress deformation of the substrate attributable to heat. For this reason, the thickness of the lower protective layer is set usually equal to or above 1 nm, preferably equal to or above 5 nm, or more preferably equal to or above 10 nm. By setting the thickness as described above, accumulation of microscopic deformation of the substrate is suppressed during the repetitive recording. Moreover, by setting the range of the film thickness as described above, it is possible to eliminate a significant noise increase attributable to retrieval light scattering.

Meanwhile, in terms of time required for film forming, the thickness of the lower protective layer is set preferably equal to or below 200 nm, more preferably equal to or below 150 nm, or even more preferably equal to or below 100 nm. By setting the thickness as described above, it is possible to eliminate deformation of shapes of grooves on the substrate from the viewpoint of a flat surface of the recording layer. That is, it is possible to reduce occurrence of a phenomenon in which depths and widths of the grooves become smaller than intended shapes on the surface of the substrate.

When the protective layer (which may be referred to as an upper protective layer) is provided on the recording layer on the opposite side of the substrate, the film thickness of the upper protective layer is set usually equal to or above 1 nm, preferably equal to or above 5 nm, or more preferably equal to or above 10 nm in order to suppress deformation of the recording layer. Meanwhile, the film thickness of the upper protective layer is set preferably equal to or below 200 nm, more preferably equal to or below 150 nm, even more preferably equal to or below 100 nm, or preferably equal to or below 50 nm in particular. By setting the film thickness of the upper protective layer in the above-described range, it is possible to prevent accumulation of microscopic plastic deformation inside the upper protective layer accompanied by the repetitive recording, to suppress a noise increase attributable to retrieval light scattering.

Here, in addition to the viewpoints of restrictions in terms of the mechanical strength and reliability, the thicknesses of the recording layer and the protective layers are also set up in consideration of an interference effect associated with the multilayer structure. That is, the thicknesses of the recording layer and the protective layers are selected appropriately so as to achieve proper absorption efficiency of the laser beam and to increase amplitudes of the recording signals (contrast between the recorded state and the unrecorded state).

(4) Reflective Layer

The optical recording medium may further include the reflective layer. The position to provide the reflective layer usually depends on an incident direction of the retrieval light. That is, the reflective layer is provided on the opposite side of the recording layer to the incident side. For example, when the retrieval light is incident from the substrate side, the reflective layer is usually provided on the opposite side of the recording layer to the substrate. In the meantime, when the retrieval light is incident from recording layer side, for example, the reflective layer is usually provided between the recording layer and the substrate.

It is preferable to use a substance having large reflectance as the material used for the reflective layer. As the material used for the reflective layer, it is particularly preferable to use metal such as Au, Ag or Al which has a potential to provide a heat radiation effect. The heat dissipation property of the reflective layer is usually determined by the film thickness and the thermal conductivity. In terms of the metal substances described above, the thermal conductivity is almost in proportion to volume resistivity thereof. Accordingly, the heat radiation characteristic of the reflective layer can be expressed by use of sheet resistivity. The sheet resistivity is set usually equal to or above $0.05\ \Omega/\square$, or preferably equal to or above $0.1\ \Omega/\square$. Meanwhile, the sheet resistivity is set usually equal to or below $0.6\ \Omega/\square$, or preferably equal to or below $0.5\ \Omega/\square$.

This particularly guarantees the high heat dissipation property. It is necessary to use the above-described reflective layer in order to suppress recrystallization to some extent when there is a significant conflict between formation of the amorphous state and recrystallization in the course of forming the amorphous marks. To control the thermal conductivity or to improve corrosion resistance of the reflective layer itself, it is also possible to add a small amount of Ta, Ti, Cr, Mo, Mg, V, Nb, Zr, Si or the like to the above-described metal. The amount of addition is usually set in a range from 0.01 atomic percent to 20 atomic percent inclusive. An aluminum alloy containing at least one of Ta and Ti in an amount equal to or below 15 atomic percent (particularly an alloy expressed by $Al_\alpha Ta_{1-\alpha}$ ($0 \leq \alpha \leq 0.15$)) is a particularly preferred material of the reflective layer due to excellent corrosion resistance to improve reliability of the optical recording medium.

Alternatively, an Ag alloy containing Ag and any one of the additive elements of Mg, Ti, Au, Cu, Pd, Pt, Zn, Cr, Si, Ge, and rare-earth element is also preferable. In particular, an Ag alloy containing the additive element described above in a range from 0.01 atomic percent to 10 atomic percent inclusive is preferable due to high reflectivity, high thermal conductivity, and excellent heat resistance.

Here, when the film thickness of the upper protective layer is set in a range from 40 nm to 50 nm inclusive, it is preferable to adjust the additive element equal to or below 2 atomic percent in order to impart high thermal conductivity to the reflective layer.

It is particularly preferable that the material of the reflective layer include Ag as the main component. It is most preferable to use pure Ag as the material of the reflective layer. The reason why it is preferable to apply Ag as the main component is as follows. Specifically, when a recording mark aged for a long period is subjected to recording again, a phenomenon in which the recrystallization rate of the phase-change recording layer is accelerated only for the first time of recording immediately after aging may occur. Although it is uncertain why such a phenomenon occurs, it is presumably because the size of the amorphous mark formed at the first time of recording immediately after aging becomes smaller than a desired size of the mark due to an increase in the recrystallization rate of the recording layer immediately after aging. Therefore, when this phenomenon occurs, the cooling rate of the recording layer is raised by applying Ag, which has an extremely high heat radiation property, to the reflective layer. In this way, recrystallization of the recording layer is suppressed for the first time of recording immediately after aging, whereby the size of the amorphous mark is maintained at the desired size.

The film thickness of the reflective layer is set usually equal to or above 10 nm in order to reflect the incident light completely without generation of transmitted light. However, the film thickness is set preferably equal to or above 20 nm, or more preferably equal to or above 40 nm. Nevertheless, when the film thickness of the reflective layer is too large, the reflective layer does not bring any change in the heat dissipation effect. Instead, this reflective layer may often cause deterioration in productivity as well as occurrence of cracks. For this reason, the film thickness of the reflective layer is set usually equal to or below 500 nm, preferably equal to or below 400 nm, or more preferably equal to or below 300 nm.

When the reflective layer made of pure Ag or including Ag as the main component is provided in contact with the protective layer including ZnS or the like that contains sulfur, an interface layer not including sulfur is usually provided to avoid corrosion attributable to a reaction between Ag and sulfur. The interface layer is preferably made of a material which functions as the reflective layer. It is possible to cite Ta and Nb as the material of the interface layer. Moreover, the film thickness of the interface layer is set usually equal to or above 1 nm. Meanwhile, the film thickness of the interface layer is set normally equal to or below 20 nm, or preferably equal to or below 10 nm.

The recording layer, the protective layer, and the reflective layer are usually formed by use of a sputtering method and the like. In light of preventing oxidation and contamination of spaces between the respective layers, it is desirable to perform film formation with an in-line system configured to dispose a recording layer target, a protective layer target, and a reflective layer material target as appropriate in the same vacuum chamber. This system is also excellent in light of productivity.

(5) Protective Coating Layer

It is preferable to provide the outermost surface of the optical recording medium with a protective coating layer made of ultraviolet curing resin or thermosetting resin in order to prevent direct contact with the air and scratches caused by contact with dust. The protective coating layer is usually formed in a thickness of 1 μm to several hundred micrometers. Moreover, it is also possible to further provide a hard dielectric protective layer thereon, and to further provide a resin layer thereon.

EXAMPLES

This embodiment will be described more concretely by showing examples below. It is to be noted, however, that this embodiment will not be limited to the following examples unless the embodiment exceeds the scope thereof.

Basic Example

A polycarbonate resin substrate having a track pitch of 0.74 μm and a thickness of 0.6 mm was formed by injection molding. A groove width was approximately 0.31 μm and a groove depth was approximately 28 nm. The shapes of the grooves were respectively determined in accordance with the optical diffraction method of U-groove approximation using a He—Cd laser beam having a wavelength of 441.6 nm. Subsequently, a $(ZnS)_{80}(SiO_2)_{20}$ protective layer in a thickness of 70 nm, a $Ge_4In_{11}Sb_{52}Sn_{22}Te_{11}$ ($Ge_4In_{11}Sn_{22}(Sb_{83}Te_{17})_{63}$) recording layer in a thickness of 13 nm, another $(ZnS)_{80}(SiO_2)_{20}$ protective layer in a thickness of 14 nm, a Ta interface layer in a thickness of 2 nm, an Ag reflective layer in a thickness of 200 nm, and an ultraviolet curing resin layer in a thickness of about 4 μm were formed in this order on the polycarbonate resin substrate. The Ta interface layer is the interface layer for preventing diffusion of S into the Ag reflective layer. The respective layers were deposited on the polycarbonate resin substrate consecutively by use of a sputtering method without breaking vacuum. However, the ultraviolet curing resin layer was coated by use of a spin coating method. Thereafter, a similar polycarbonate resin substrate having a thickness of 0.6 mm without formation of the films was attached thereto through an adhesive so as to locate a surface of the above-described recording layer to the inside. In this way, a phase-change optical recording medium (hereinafter simply referred to as a disc) was fabricated.

The film thicknesses of the respective layers were controlled by sputter film forming periods after the film forming rate was measured. The composition of the recording layer applied values based on fluorescent intensities of the respective elements by use of a fluorescent x-ray method, which values were corrected with an absolute composition obtained separately by a chemical analysis (atomic absorption spectrometry).

Next, initial crystallization was performed. A laser beam having a wavelength of 810 nm, a prolate ellipsoidal shape focused into a long axis of about 75 μm and a short axis of about 1 m, and power of 1500 mW was used for initial crystallization. Then, this laser beam was applied onto the disc rotated at 24 m/s while setting the long axis perpendicular to the guide groove. Then, initial crystallization was performed by moving the laser beam continuously in a radial direct at a moving amount of 50 μm per revolution.

A DDU1000 Tester (having a wavelength of about 650 nm, NA=0.65, and a spot shape equivalent to a 0.86-μm circle at intensity of $1/e^2$) made by Pulstec Industrial Co., Ltd. was used for recording and retrieving evaluation. A standard linear velocity for a DVD equal to 3.49 m/s was defined as a 1-times velocity, and an overwrite characteristic was evaluated at a 4-times velocity or faster.

A reference clock period for data at the respective linear velocities was rendered inversely proportional to a reference clock period for data of 38.2 nsec at the 1-times linear velocity.

The retrieval was performed at the 1-times linear velocity unless otherwise stated. An output signal from the DDU1000 was put through a high frequency passage filter provided with cut-offs in a range from 5 to 20 kHz, and then jitter was measured with a time interval analyzer (made by Yokogawa Electric Corporation) Retrieving power Pr was set to 0.6 mW.

An arbitrary signal generator (AWG710, made by Sony Tektronix, Inc.) was used for generation of a logical level for controlling the method of dividing the recording pulse. A logical signal at an ECL level from this arbitrary signal generator was defined as a gate signal, and this gate signal was inputted to a laser driver of the above-described tester.

(Experiment 1)

The disc prepared in the basic example was subjected to 10 times overwrite recording of EFM+ random data while setting the linear velocity to a 10-times velocity. Then, a dependency of data to clock jitter (a value normalized by the reference clock period T and expressed in percentage will be hereinafter simply referred to as jitter) of recording data upon the recording power Pw was measured. Settings of pulse sequences for recording respective mark lengths are shown in Table 1.

TABLE 1

| Mark Length | m | Delay Time | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ |
|---|---|---|---|---|---|---|---|---|---|---|---|---|
| 3T | 1 | −0.07 | 1.33 | 0.67 | | | | | | | | |
| 4T | 1 | 0.00 | 1.67 | 1.47 | | | | | | | | |
| 5T | 2 | −0.33 | 1.33 | 1.13 | 1.13 | 0.73 | | | | | | |
| 6T | 2 | −0.07 | 1.33 | 1.67 | 1.27 | 0.73 | | | | | | |
| 7T | 2 | 0.00 | 1.33 | 2.00 | 1.87 | 0.73 | | | | | | |
| 8T | 3 | 0.00 | 1.33 | 1.67 | 1.33 | 1.00 | 1.00 | 0.73 | | | | |
| 9T | 3 | 0.00 | 1.33 | 1.67 | 1.33 | 1.67 | 1.20 | 0.73 | | | | |
| 10T | 3 | 0.00 | 1.33 | 1.67 | 1.33 | 2.00 | 1.87 | 0.73 | | | | |
| 11T | 4 | 0.00 | 1.33 | 1.67 | 1.33 | 1.67 | 1.33 | 1.00 | 1.00 | 0.73 | | |
| 14T | 5 | 0.00 | 1.33 | 1.67 | 1.33 | 1.67 | 1.33 | 1.67 | 1.33 | 1.00 | 1.00 | 0.73 |

Irradiation timing of the pulse sequence was shifted for a predetermined time period depending on the mark length, and the time periods were indicated in the column "Delay Time" in Table 1. The numerical values were normalized by the clock period T. A case of delaying the irradiation timing was defined as +(plus) and a case of advancing was defined as − (minus). By providing the delay time, the formed marks approximate to the ideal EFM+ random signal. Accordingly, the jitter is improved. The bias power Pb was set to 0.5 mW. The erasing power (Pe) at 6.2 mW was applied on intervals between the marks (portions not indicated in Table 1). A result of measurement of the dependency of the data to clock jitter on the recording power Pw is shown in FIG. 1.

From the result shown in FIG. 1, it is apparent that a jitter value of 8.5% was obtained at the recording power Pw in a range from 22 mW to 23 mW, which represented a sufficient characteristic suitable for practical application.

(Experiment 2)

The disc prepared in the basic example was subjected to 10 times overwrite recording of EFM+ random data while setting the linear velocity to a 4-times velocity. Then, a dependency of data to clock jitter of recording data upon the recording power Pw was measured. Settings of pulse sequences for recording respective mark lengths are shown in Table 2.

TABLE 2

| Mark Length | m | Delay Time | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ |
|---|---|---|---|---|---|---|---|---|---|---|---|---|
| 3T | 1 | 0.07 | 0.53 | 2.00 | | | | | | | | |
| 4T | 1 | −0.07 | 0.93 | 2.93 | | | | | | | | |

TABLE 2-continued

| Mark Length | m | Delay Time | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ |
|---|---|---|---|---|---|---|---|---|---|---|---|---|
| 5T | 2 | −0.27 | 0.53 | 1.53 | 0.53 | 2.27 | | | | | | |
| 6T | 2 | −0.07 | 0.53 | 2.33 | 0.53 | 2.27 | | | | | | |
| 7T | 2 | 0.00 | 0.53 | 3.00 | 0.73 | 2.27 | | | | | | |
| 8T | 3 | 0.00 | 0.53 | 2.47 | 0.53 | 1.27 | 0.53 | 2.27 | | | | |
| 9T | 3 | 0.00 | 0.53 | 2.47 | 0.53 | 2.00 | 0.80 | 2.27 | | | | |
| 10T | 3 | 0.00 | 0.53 | 2.47 | 0.53 | 2.80 | 1.00 | 2.27 | | | | |
| 11T | 4 | 0.00 | 0.53 | 2.47 | 0.53 | 2.47 | 0.53 | 1.27 | 0.53 | 2.27 | | |
| 14T | 5 | 0.00 | 0.53 | 2.47 | 0.53 | 2.47 | 0.53 | 2.47 | 0.53 | 1.27 | 0.53 | 2.27 |

The erasing power Pe was set to 6 mW, and the bias power Pb was set to 0.5 mW. A result of measurement of the dependency of the data to clock jitter on the recording power Pw is shown in FIG. 1. From the result shown in FIG. 1, it is apparent that a jitter value of 9.4% was obtained in a range from 21 mW to 22 mW, which represented a sufficient characteristic suitable for practical application. However, the data to clock jitter at the 4-times velocity recording showed slightly worse values than those in the 10-times velocity recording. Considering that the characteristics of focusing, tracking servo, and the like are deemed to be more advantageous at the low linear velocity, it is conceivable that there is a possibility of improving the jitter values.

Accordingly, mark length jitter was measured in terms of each of the mark lengths of the recording signals at the optimal recording power of 22 mW. A result of measurement of the mark length jitter is shown in Table 3.

TABLE 3

| Mark Length | Mark Length Jitter (%) | Divided Pulse Number: m |
|---|---|---|
| 3T | 13.9 | 1 |
| 4T | 7.4 | 1 |
| 5T | 15.4 | 2 |
| 6T | 11.5 | 2 |
| 7T | 10.2 | 2 |
| 8T | 10.6 | 3 |
| 9T | 9.3 | 3 |
| 10T | 10.8 | 3 |
| 11T | 7.8 | 4 |
| 14T | 8.1 | 5 |

From the result shown in Table 3, it is obvious that the mark length jitter of the 5T mark which is the shortest at the divided number m=2, and the mark length jitter of the 3T mark which is the shortest at the divided number m=1 are defective as compared to other mark lengths. This deterioration in the jitter characteristic at the short marks seems to be the cause of deterioration in the entire jitter. Here, deviation of an average value of the mark length from an ideal value is reduced to the same degree in every mark length.

The reason for the defective mark length jitter seems due to the fact that the cooling rates were not adequate under the recording conditions of the 5T mark and the 3T mark, and to the fact that recrystallization of the recording layer was too intense after melting. Because, the difference in the recording pulse sequences between the 5T mark and the 6T mark is limited to the size of $\beta_1$, and it is apparent that the mark length jitter will be improved by increasing $\beta_1$ to accelerate the cooling rate (naturally, the 5T mark will be too long in this case). In terms of 3T, the front end recording pulse $\alpha_1$ is the same as those in other mark lengths except 4T. Therefore, it is conceivable that the cause of the poor mark length jitter is attributable to the slow cooling rate at this part.

Accordingly, pulse sequences shown in Table 4 were used to accelerate the cooling rates. Moreover, overwrite recording of EFM+ random data was performed for 10 times while setting the linear velocity to the 4-times velocity. Then, the mark length jitter was measured again. The recording power Pw was set to 22 mW, the erasing power Pe was set to 6 mW, and the bias power Pb was set to 0.5 mW. Changes of the recording pulse sequences as compared to Table 2 are limited to decreases in the $\alpha_1$ values and increases in the $\beta_1$ values in terms of 5T and 3T. At this time, the average values of the mark lengths were adjusted to avoid any changes. A result of measurement of the mark length jitter is shown in Table 5.

TABLE 4

| Mark Length | m | Delay Time | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ |
|---|---|---|---|---|---|---|---|---|---|---|---|---|
| 3T | 1 | 0.07 | 0.33 | 2.33 | | | | | | | | |
| 4T | 1 | −0.07 | 0.93 | 2.93 | | | | | | | | |
| 5T | 2 | −0.27 | 0.33 | 2.07 | 0.33 | 2.27 | | | | | | |
| 6T | 2 | −0.07 | 0.53 | 2.33 | 0.53 | 2.27 | | | | | | |
| 7T | 2 | 0.00 | 0.53 | 3.00 | 0.73 | 2.27 | | | | | | |
| 8T | 3 | 0.00 | 0.53 | 2.47 | 0.53 | 1.27 | 0.53 | 2.27 | | | | |
| 9T | 3 | 0.00 | 0.53 | 2.47 | 0.53 | 2.00 | 0.80 | 2.27 | | | | |
| 10T | 3 | 0.00 | 0.53 | 2.47 | 0.53 | 2.80 | 1.00 | 2.27 | | | | |
| 11T | 4 | 0.00 | 0.53 | 2.47 | 0.53 | 2.47 | 0.53 | 1.27 | 0.53 | 2.27 | | |
| 14T | 5 | 0.00 | 0.53 | 2.47 | 0.53 | 2.47 | 0.53 | 2.47 | 0.53 | 1.27 | 0.53 | 2.27 |

TABLE 5

| Mark Length | Mark Length Jitter (%) | Divided Pulse Number: m |
|---|---|---|
| 3T | 13 | 1 |
| 4T | 7.1 | 1 |

TABLE 5-continued

| Mark Length | Mark Length Jitter (%) | Divided Pulse Number: m |
|---|---|---|
| 5T | 15.2 | 2 |
| 6T | 11.5 | 2 |
| 7T | 9.8 | 2 |
| 8T | 10.5 | 3 |
| 9T | 9.8 | 3 |
| 10T | 9.9 | 3 |
| 11T | 7.8 | 4 |
| 14T | 8 | 5 |

From the result shown in Table 5, it is apparent that the jitter values of 5T and 3T were not improved very much although the cooling rates seemed to be accelerated. The cause of this circumstance seemed due to the fact that the temperature of a mark forming portion was not raised adequately owing to reduction in the $\alpha_1$ value.

(Experiment 3)

In Experiment 2, the cause of the circumstance that the jitter values of 5T and 3T are not improved very much although the cooling rates seem to be accelerated are considered due to the fact that the temperature of the mark forming portion is not raised adequately owing to reduction in the $\alpha_1$ value. Accordingly, the following measurement was performed in order to verify this hypothesis. To the portion subjected to 10 times overwrite recording of the EFM+ random data while setting the linear velocity to the 4-times velocity at Pw=22 mW, Pe=6 mW, and Pb=0.5 mW in accordance with the settings of the pulse sequences shown in Table 4, a 5T tone signal (a signal targeted for 5T in terms of both of the mark length and a length between the marks) was overwritten once by use of the 5T pulse sequence in Table 4 while changing the recording power Pw (20 to 28 mW). Then, the mark length jitter was measured. The reason for changing the overwrite signal into the tone signal at the finial recording is to remove an effect of changes of the marks having different lengths caused by changing the recording power. Measurement of the mark length jitter was also performed similarly in terms of 3T. A result of measurement is shown in FIG. 2.

From the result shown in FIG. 2, it is apparent that the mark length jitter is substantially improved by raising the recording power. Therefore, it is possible to judge that the recording power at 22 mW is insufficient of power for the pulse sequences of 5T and 3T in Table 4.

The above-described result strongly suggests that it is possible to improve the entire data to clock jitter by setting the recording power to 22 mW in terms of the mark lengths other than 5T and 3T and raising the recording power only in terms of 5T and 3T. However, in terms of 5T and 3T, it seems necessary to carry out fine tuning of the mark lengths (fine tuning of $\alpha_1$ and $\beta_1$) which are changed by raising the recording power.

Although the present invention has been described in detail with reference to the specific embodiment, it is obvious to those skilled in the art that various modifications and alterations are possible without departing from the spirit and scope of the present invention.

INDUSTRIAL APPLICABILITY

According to the present invention, it is possible to achieve fine rewriting by performing overwriting in accordance with a specific recording method on a medium which allows a high data transfer rate. In particular, it is possible to realize fine overwrite recording when recording on an optical recording medium allowing a high transfer rate at a relatively low linear velocity.

This application is based upon the previous Japanese Patent Application No. 2003-358054 filed on Oct. 17, 2003; the entire contents of which are incorporated herein by reference.

What is claimed is:

1. An optical recording method configured to apply recording light locally on an optical recording medium and to record information subjected to mark length modulation by use of recording marks having a plurality of time lengths, the method comprising the steps of:

dividing a light irradiation time period when defining a time length of one recording mark as nT (T is a reference clock period and n is a natural number equal to or above 2) for recording a recording mark having a time length of nT in the order of $\alpha_1 T, \beta_1 T, \alpha_2 T, \beta_2 T, \ldots, \alpha_i T, \beta_i T, \ldots, \alpha_m T, \beta_m T$ (in which m is a natural number representing a divided pulse number, $\alpha_i$ ($1 \leq i \leq m$) is a real number greater than 0, $\beta_i$ ($1 \leq i \leq m-1$) is a real number greater than 0, and $\beta_m$ is a real number equal to or above 0);

applying recording light having recording power $Pw_i$ ($1 \leq i \leq m$) in time periods of the $\alpha_i T$ ($1 \leq i \leq m$);

applying recording light having bias power Pb satisfying $Pb \leq 0.2 \times Pw_i$ ($1 \leq i \leq m$) in time periods of the $\beta_i T$ ($1 \leq i \leq m$);

setting the divided pulse number m equal to or above 2 in terms of at least one recording mark out of the recording marks having the plurality of time lengths; and forming a plurality of recording marks each having a respective time length of nT by use of the same divided pulse number m, wherein there is an m satisfying $Pw_{short} > Pw_{long}$, an average value of the recording power $Pw_i$ at the time periods of $\alpha_i T$ ($1 \leq i \leq m$) for forming a recording mark having a longest nT among the plurality of recording marks each having the respective time lengths of nT is defined as $Pw_{long}$, and an average value of the recording power $Pw_i$ at the time periods of $\alpha_i T$ ($1 \leq i \leq m$) for forming a recording mark having a shortest nT among the plurality of recording marks each having the respective time lengths of nT is defined as $PW_{short}$.

2. The optical recording method according to claim 1, wherein the m satisfying $Pw_{short} > Pw_{long}$ is equal to 1 or 2.

3. The optical recording method according to claim 1 for recording the information subjected to the mark length modulation by use of two types of a recording linear velocity $V_{min}$ and a recording linear velocity $V_{max}$ (where $V_{max} > V_{min}$), wherein there is the m satisfying $Pw_{short} > Pw_{long}$ at the recording linear velocity $V_{min}$.

4. The optical recording method according to claim 3, wherein a relation between the recording linear velocity $V_{min}$ and the recording linear velocity $V_{max}$ satisfies $V_{max} \leq 2V_{min}$.

5. The optical recording method according to claim 1, wherein, m periods of the recording power $Pw_i$ in the range of $1 \leq i \leq m$ for forming the recording mark having the longest nT among the recording marks each having the respective of the plurality of the time lengths of nT are respectively set equal to $Pw_i$, at least part of the recording power $Pw_i$ out of m periods of the recording power $Pw_i$ in the range of $1 \leq i \leq m$ for forming the recording mark having the shortest nT among the recording marks each having the respective of the plurality of the time lengths of nT is set equal to $Pw_0$, remaining periods of the recording power $Pw_i$ are set equal to $Pw_1$, and a relation between $Pw_0$ and $Pw_1$ satisfies $Pw_0 > Pw_1$.

6. The optical recording method according to claim 5, wherein all the m periods of the recording power $Pw_i$ in the range of $1 \leq i \leq m$ for forming the recording mark having the shortest nT among the recording marks each having the respective of the plurality of the time lengths nT are set equal to $Pw_0$.

7. The optical recording method according to claim 1, wherein the optical recording medium comprises a phase-change recording layer configured to record the information by use of a crystalline state and an amorphous state and to be able to rewrite the information.

8. The optical recording method according to claim 1, wherein $1.15 \times Pw_{long} \leq Pw_{short} \leq 1.4 \times Pw_{long}$.

9. The optical recording method according to claim 1, wherein a reflective layer of the recording medium includes an alloy expressed by $Al_\gamma T_{1-\gamma}$, $0 \leq \gamma \leq 0.15$.

10. An optical recording apparatus configured to apply recording light locally on an optical recording medium and to record information subjected to mark length modulation by use of a plurality of recording marks having a plurality of time lengths, the apparatus comprising:

a controller configured to divide a light irradiation time period, when a respective time length of each of the plurality of recording marks is defined as nT, for recording each of the plurality of recording marks in the order of $\alpha_1 T, \beta_1 T, \alpha_2 T, \beta_2 T, \ldots, \alpha_i T, \beta_i T, \ldots, \alpha_m T, \beta_m T$, in which m is a natural number representing a respective divided pulse number, $\alpha_i (1 \leq i \leq m)$ is a respective real number greater than 0, $\beta_i (1 \leq i \leq m-1)$ is a respective real number greater than 0, $\beta_m$ is a respective real number greater than or equal to 0, T is a reference clock period, and n is a respective natural number greater than or equal to 2;

a driver unit configured to apply recording light having recording power $Pw_i (1 \leq i \leq m)$ in $\alpha_i T$ $(1 \leq i \leq m)$ time periods and to apply recording light having bias power Pb satisfying $Pb \leq 0.2 \times Pw_i$ $(1 \leq i \leq m)$ in $\beta_i T$ $(1 \leq i \leq m)$ time periods;

a processor configured to set the respective divided pulse number greater than or equal to 2 for at least one of the plurality of recording marks; and a light emitting unit configured to form at least two of the plurality of recording marks by use of a same respective divided pulse number, wherein $Pw_{short} > Pw_{long}$, where an average value of the recording power $Pw_i$ at the $\alpha_i T$ $(1 \leq i \leq m)$ time periods for forming one of the at least two of the plurality of recording marks having a longest nT is defined as $Pwl_{long}$, and an average value of the recording power Pw, at the $\alpha_i T$ $(1 \leq i \leq m)$ time periods for forming one of the at least two of the plurality of recording marks having a shortest nT is defined as $Pw_{short}$.

\* \* \* \* \*